(12) United States Patent
Aragaki et al.

(10) Patent No.: US 8,297,760 B2
(45) Date of Patent: Oct. 30, 2012

(54) PROJECTOR HAVING CORRESPONDING LENS SHIFT AND SUB-PIXEL MAPPING ELEMENTS

(75) Inventors: Takumi Aragaki, Matsumoto (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 475 days.

(21) Appl. No.: 12/409,218

(22) Filed: Mar. 23, 2009

(65) Prior Publication Data

US 2009/0244493 A1    Oct. 1, 2009

(30) Foreign Application Priority Data

Apr. 1, 2008   (JP) ................................ 2008-094761

(51) Int. Cl.
    *G03B 21/14* (2006.01)
(52) U.S. Cl. ......................................... 353/101; 353/69
(58) Field of Classification Search ............. 353/30–31, 353/69–70, 122, 100–101; 345/696, 613, 345/694, 698; 382/299
    See application file for complete search history.

(56) References Cited

U.S. PATENT DOCUMENTS

| | | | |
|---|---|---|---|
| 7,322,701 B2* | 1/2008 | Kamimura et al. | 353/69 |
| 7,420,592 B2* | 9/2008 | Freeman | 348/219.1 |
| 8,144,168 B2* | 3/2012 | Aragaki et al. | 345/613 |
| 2004/0041985 A1* | 3/2004 | Kimura et al. | 353/70 |
| 2005/0068506 A1* | 3/2005 | Moriwaki et al. | 353/101 |
| 2006/0158545 A1* | 7/2006 | Hirai | 348/333.01 |
| 2006/0204125 A1* | 9/2006 | Kempf et al. | 382/274 |
| 2008/0284987 A1* | 11/2008 | Yonezawa | 353/70 |
| 2009/0244088 A1* | 10/2009 | Aragaki et al. | 345/613 |
| 2010/0026899 A1* | 2/2010 | Aragaki et al. | 348/607 |
| 2010/0033405 A1* | 2/2010 | Aragaki et al. | 345/55 |
| 2010/0079477 A1* | 4/2010 | Hasegawa | 345/589 |
| 2010/0079478 A1* | 4/2010 | Hasegawa | 345/589 |
| 2012/0147056 A1* | 6/2012 | Aragaki et al. | 345/672 |

FOREIGN PATENT DOCUMENTS

JP   A-61-150487   7/1986

* cited by examiner

*Primary Examiner* — Tony Ko
*Assistant Examiner* — Jori S Reilly-Diakun
(74) *Attorney, Agent, or Firm* — Oliff & Berridge, PLC

(57) ABSTRACT

Embodiments include an image processing device having a lens-shift amount acquisition section adapted to acquire an amount of shift of a projection lens of an image display apparatus, and an image signal correction section adapted to correct the image signal corresponding to a sub-pixel of a pixel in accordance with the amount of shift acquired by the lens-shift amount acquisition section to correct displacement of the sub-pixel relative to another sub-pixel of the pixel due to the lens-shift.

13 Claims, 19 Drawing Sheets

| AMOUNT OF LENS-SHIFT | | P1 | | P2 | | P3 | | P4 | |
|---|---|---|---|---|---|---|---|---|---|
| | Lx | Ly | ΔR | ΔB | ΔR | ΔB | ΔR | ΔB | ΔR | ΔB |
| Z1 | -1.0 | 1.0 | (ΔR11x, ΔR11y) | (ΔB11x, ΔB11y) | (ΔR21x, ΔR21y) | (ΔB21x, ΔB21y) | (ΔR31x, ΔR31y) | (ΔB31x, ΔB31y) | (ΔR41x, ΔR41y) | (ΔB41x, ΔB41y) |
| Z2 | 0.0 | 1.0 | (ΔR12x, ΔR12y) | | | | | | | |
| Z3 | 1.0 | 1.0 | | | | | | | | |
| Z4 | -1.0 | 0.0 | | | | | | | | |
| Z5 | 0.0 | 0.0 | | | | | | | | |
| Z6 | 1.0 | 0.0 | | | | | | | | |
| Z7 | -1.0 | -1.0 | | | | | | | | |
| Z8 | 0.0 | -1.0 | | | | | | | | |
| Z9 | 1.0 | -1.0 | (ΔR19x, ΔR19y) | (ΔB19x, ΔB19y) | (ΔR29x, ΔR29y) | (ΔB29x, ΔB29y) | (ΔR39x, ΔR39y) | (ΔB39x, ΔB39y) | (ΔR49x, ΔR49y) | (ΔB49x, ΔB49y) |

FIG. 7

| AMOUNT OF LENS-SHIFT | | P1 | | P4 | |
|---|---|---|---|---|---|
| Lx | Ly | ΔR | ΔB | ΔR | ΔB |
| -1.0 | 1.0 | (ΔR11x, ΔR11y) | (ΔB11x, ΔB11y) | (ΔR41x, ΔR41y) | (ΔB41x, ΔB41y) |
| 0.0 | 1.0 | (ΔR12x, ΔR12y) | | | |
| 1.0 | 1.0 | | | | |
| -1.0 | 0.0 | | | | |
| 0.0 | 0.0 | | | | |
| 1.0 | 0.0 | | | | |
| -1.0 | -1.0 | | | | |
| 0.0 | -1.0 | | | | |
| 1.0 | -1.0 | (ΔR19x, ΔR19y) | (ΔB19x, ΔB19y) | (ΔR49x, ΔR49y) | (ΔB49x, ΔB49y) |

FIG. 19

| AMOUNT OF LENS-SHIFT | | P1 | | P2 | | P3 | | P4 | |
|---|---|---|---|---|---|---|---|---|---|
| Lx | Ly | ΔR | ΔB | ΔR | ΔB | ΔR | ΔB | ΔR | ΔB |
| Z1 -1.0 | 1.0 | (ΔR11x, ΔR11y) | (ΔB11x, ΔB11y) | (ΔR21x, ΔR21y) | (ΔB21x, ΔB21y) | (ΔR31x, ΔR31y) | (ΔB31x, ΔB31y) | (ΔR41x, ΔR41y) | (ΔB41x, ΔB41y) |
| Z3 1.0 | 1.0 | --- | --- | --- | --- | --- | --- | --- | --- |
| Z7 -1.0 | -1.0 | --- | --- | --- | --- | --- | --- | --- | --- |
| Z9 1.0 | -0.0 | (ΔR19x, ΔR19y) | (ΔB19x, ΔB19y) | (ΔR29x, ΔR29y) | (ΔB29x, ΔB29y) | (ΔR39x, ΔR39y) | (ΔB39x, ΔB39y) | (ΔR49x, ΔR49y) | (ΔB49x, ΔB49y) |

FIG. 22

PROJECTOR HAVING CORRESPONDING LENS SHIFT AND SUB-PIXEL MAPPING ELEMENTS

BACKGROUND

1. Technical Field

The present invention relates to an image processing device, an image display apparatus, and an image processing method.

2. Related Art

In recent years, high performance image display apparatuses such as large screen televisions or projectors have been spread widely, and in such image display apparatuses, improvement in image quality of the display images becomes further more important. In particular, regarding the projectors as image display apparatuses capable of enhancing freedom of installation owing to a lens shift function allowing alteration of positions of projection images on the screen without moving the housing, demands on further improvements in image quality have been increased due to an improvement of the image quality of contents themselves.

Regarding such projectors, JP-A-61-150487 discloses a projector using a transmissive matrix liquid crystal display device as a light valve. This projector is provided with a plurality of dichroic mirrors, separates a light beam from a light source into three light beams of primary colors of R, G, and B with the plurality of dichroic mirrors, transmits the light beams through respective liquid crystal display devices, and then projects the light beams on a screen via a projection lens. In this case, the transmitted light beams from the liquid crystal display devices are combined by an optical device such as a mirror in such a manner as to match the two-dimensional pixel arrangements with each other.

In this kind of projector, it is possible to achieve improvement in image quality of display images by increasing the number of pixels of the matrix liquid crystal display device, for example, and executing light modulation based on the image signal corresponding to the contents to execute image display.

However, if the number of pixels of a display image by the projector is increased, positioning of each pixel by an optical system tends to become more difficult. For example, a projection lens provided to the projector has chromatic aberration, and the refractive index thereof varies with the wavelength. Therefore, unprecedented accuracy is required for the aberration accuracy of the optical system provided to the projector. However, since projection conditions for the optical system are varied by shifting the projection lens, it is difficult to accurately adjust all of the display positions of sub-pixels constituting each pixel.

Although such misalignment of the display positions of the sub-pixels has been negligible with small number of display pixels, the misalignment of the display positions of the sub-pixels has become noticeable as the number of display pixels increases, and the misalignment of the display positions of the sub-pixels has come to incur degradation of image quality.

SUMMARY

In view of the technical problems described above, the present invention has an advantage of providing an image processing device, an image display apparatus, and an image processing method capable of preventing degradation of image quality caused by the misalignment of the display positions of the sub-pixels constituting each pixel due to, for example, the lens shift function.

An aspect of the invention relates to an image processing device including a lens-shift amount acquisition section adapted to acquire an amount of shift of a projection lens of an image display device, and an image signal correction section adapted to correct the image signal corresponding to a sub-pixel constituting a pixel in accordance with the amount of shift acquired by the lens-shift amount acquisition section.

According to this aspect of the invention, since it is arranged that the amount of shift of the lens of the image display apparatus having a lens shift function is acquired, and the image signal corresponding to the sub pixel constituting a pixel is corrected in accordance with the amount of shift, it becomes possible to prevent the degradation of image quality due to the misalignment of the display position of the display sub-pixel corresponding to the sub-pixel regardless of the color aberration accuracy of the optical system provided to the image display apparatus.

Further, in the image processing device according to another aspect of the invention, it is possible that a misalignment amount storage section adapted to store an amount of misalignment of a display position of a display sub-pixel corresponding to the sub-pixel at a plurality of reference positions in a display screen displayed by the image display apparatus correspondingly to the amount of shift of the lens is further provided, and the image signal correction section corrects the image signal corresponding to the sub-pixel using the amount of misalignment stored in the misalignment amount storage section.

According to this aspect of the invention, since it is arranged that the amount of misalignment of the display position of the display sub-pixel corresponding to the sub-pixel constituting the pixel at a plurality of reference positions in the display screen is stored in the misalignment amount storage section, and the image signal corresponding to the sub-pixel is corrected based on the amount of misalignment stored in the misalignment amount storage section, it becomes possible to accurately prevent the degradation of image quality due to the misalignment of the display position of the display sub-pixel corresponding to the sub-pixel by, for example, reflecting the measurement value to the misalignment amount storage section.

Further, in the image processing device according to another aspect of the invention, it is possible that the image signal correction section includes a representative sub-pixel misalignment amount calculation section adapted to calculate an amount of misalignment of a display position of the display sub-pixel at a given representative point in the display screen corresponding to the amount of shift based on the amount of misalignment stored in the misalignment amount storage section, and the image signal correction section obtains, based on the amount of misalignment in the representative point calculated by the representative sub-pixel misalignment amount calculation section, an amount of misalignment of a display position of a display sub-pixel corresponding to the sub-pixel constituting a present pixel, and corrects the image signal corresponding to the sub-pixel using the amount of misalignment of the display position of the display sub-pixel.

According to this aspect of the invention, since it is arranged that after calculating the amount of misalignment of the display position of the display sub-pixel at the representative point in the display screen corresponding to the amount of shift based on the amount of misalignment stored in the misalignment amount storage section, the amount of misalignment of the display position of the display sub-pixel corresponding to the sub-pixel constituting the present pixel is calculated, and then the image signal corresponding to the sub-pixel is corrected based on the amount of misalignment, the highly accurate correction of the image signal corresponding to the amount of shift becomes possible, and it becomes also possible to accurately prevent the degradation of image quality due to the misalignment of the display position of the display sub-pixel corresponding to the sub-pixel.

Further, in an image processing device according to another aspect of the invention, it is possible that the representative point corresponds to a pixel position at an upper left end, an upper right end, a lower left end, or a lower right end of the display screen displayed with the amount of shift.

According to this aspect of the invention, it becomes possible to correct the image signal of the sub-pixels corresponding to the display sub-pixels at any pixel position in the display screen with a little process load without storing a lot of amounts of misalignment in the misalignment amount storage section.

Further, in the image processing device according to another aspect of the invention, it is possible that the misalignment amount storage section stores amounts of misalignment at a first pixel position at an upper left end, a second pixel position at an upper right end, a third pixel position at a lower left end, and a fourth pixel position at a lower right end of the display screen.

According to this aspect of the invention, it becomes possible to correct the image signal of the sub-pixels corresponding to the display sub-pixels at any pixel position in the display screen with a little process load without storing a lot of amounts of misalignment in the misalignment amount storage section.

Further, in an image processing device according to another aspect of the invention, it is possible that each of the pixels is composed mainly of a sub-pixel of an R component, a sub-pixel of a G component, and a sub-pixel of a B component, and the misalignment amount storage section stores, based on a display position of a display sub-pixel corresponding to the sub-pixel of the G component, an amount of misalignment of a display position of a display sub-pixel corresponding to the sub-pixel of the R component constituting the display pixel, and an amount of misalignment of a display position of a display sub-pixel corresponding to the sub-pixel of the B component constituting the display pixel.

According to this aspect of the invention, the storage capacity necessary for the misalignment amount storage section can be reduced, thus it becomes possible to achieve cost reduction of the image processing device. Moreover, according to this aspect of the invention, since the image signals corresponding to the sub-pixels of the R component and the B component are corrected in accordance with the display position of the display sub-pixel corresponding to the sub-pixel of the G component, the correction process for the image signal corresponding to the sub-pixel of the G component can be eliminated. Further, by taking the G component as the reference, which can easily be recognized by the human eyes, the process using the amount of misalignment can be made easy to deal with.

Further, another aspect of the invention relates to an image display apparatus including a projection lens, either one of the image processing devices described above, and an image display section adapted to display an image based on the image signal of the sub-pixel corrected by the image processing device.

According to this aspect of the invention, it becomes possible to provide the image display apparatus capable of preventing the degradation of image quality due to the misalignment of the display position of the sub-pixel constituting each pixel caused by the lens shift function.

Further, another aspect of the invention relates to an image processing method adapted to correct an image signal designating an amount of modulation of a passing light beam of a lens of an image display apparatus having a lens shift function, including the steps of acquiring an amount of shift of the lens, and correcting the image signal corresponding to a sub-pixel constituting a pixel in accordance with the amount of shift acquired in the acquiring step.

According to this aspect of the invention, since it is arranged that the amount of shift of the lens of the image display apparatus having a lens shift function is acquired, and the image signal corresponding to the sub pixel constituting a pixel is corrected in accordance with the amount of shift, it becomes possible to prevent the degradation of image quality due to the misalignment of the display position of the display sub-pixel corresponding to the sub-pixel regardless of the color aberration accuracy of the optical system provided to the image display apparatus.

BRIEF DESCRIPTION OF THE DRAWINGS

The invention will now be described with reference to the accompanying drawings, wherein like numbers reference like elements.

FIG. 7 is a diagram showing an example of the amounts of misalignment stored in the misalignment amount storage section.

FIG. 19 is a diagram showing the amounts of misalignment stored in the misalignment amount storage section in the first modified example of the present embodiment.

FIG. 22 is a diagram showing amounts of misalignment stored in the misalignment amount storage section in the third modified example of the present embodiment.

DESCRIPTION OF EXEMPLARY EMBODIMENTS

Hereinafter, an embodiment of the invention will be described in detail with reference to the accompanying drawings. It should be noted that the embodiment described below do not unreasonably limit the content of the invention as set forth in the appended claims. Further, it is not necessarily true that all of the constituents described below are essential elements of the invention.

Although explanations will hereinafter be presented exemplifying a projector as the image display apparatus according to the invention, the image display apparatus according to the invention is not limited to the projector. In other words, the degradation of the image quality due to the misalignment of the display position of the display sub-pixel corresponding to the sub-pixel constituting each pixel is thought to be a phenomenon, which can occur in various types of image display apparatuses besides the projector, and therefore, the image display apparatus according to the invention is not limited to the projector.

Figure 1:
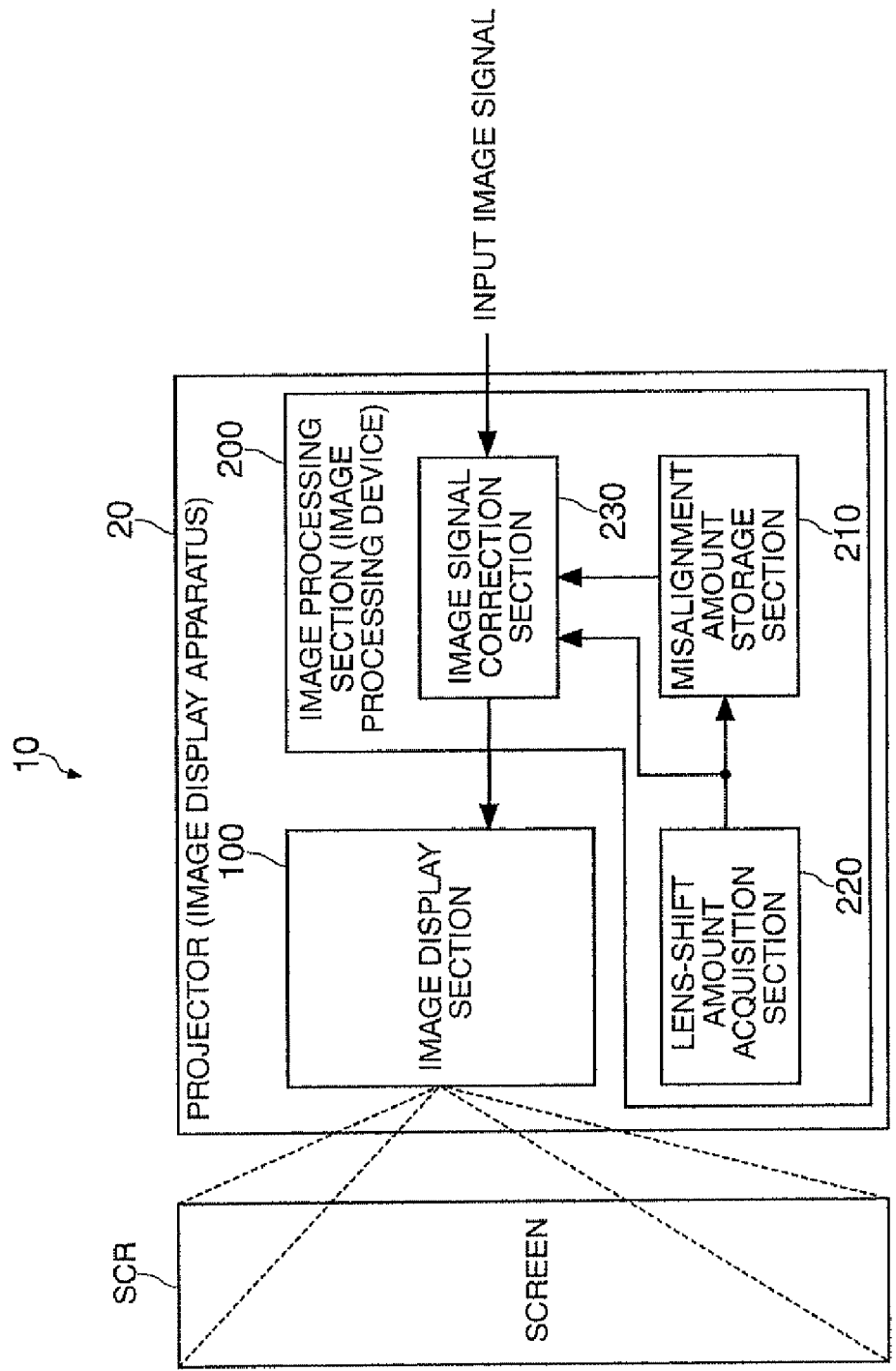
FIG. 1 is a block diagram of a configuration example of an image display system to which an image display apparatus according to an embodiment of the invention is applied.

FIG. 1 is a block diagram of a configuration example of an image display system to which the image display apparatus according to the embodiment of the invention is applied.

The image display system 10 in the present embodiment includes a projector 20 as the image display apparatus and a screen SCR. The projector 20 is provided with an input image signal input thereto, the input image signal corresponding to a pixel value of each of a plurality of sub-pixels constituting each pixel. The projector 20 modulates a light beam from a light source not shown based on the input image signals to project the light beam thus modulated on the screen SCR.

Such a projector 20 includes an image display section 100 and an image processing section (an image processing device, in a broad sense) 200.

The image processing section 200 is provided with the input image signals input thereto, corrects the input image signals so as to suppress generation of false colors due to the misalignment of the display position of the display sub-pixel on the screen SCR, the display sub-pixel corresponding to the sub-pixel, and then supplies the image display section 100 with the image signals thus corrected. Here, the false color denotes the color (not existing in the image desired to be displayed) of the image not originally intended.

The image display section 100 controls an amount of modulation of the light beam from a light source not shown based on the image signals corrected by the image processing section 200, and projects the light beam thus modulated on the screen SCR by a projection lens (a lens). The image display section 100 is provided with a so-called lens shift function. The lens shift function is a function of moving the position of the projection image on the screen SCR by moving the body tube of the projection lens without moving the housing of the projector 20. By implementing such a lens shift function, it becomes possible to enhance freedom of installation of the projector 20, and to improve the usability thereof.

The pixel (the display pixel) of the projection image (the display image) displayed on the screen SCR by such an image display section 100 has a luminescent spot as an image on the screen SCR of the pixel of the light modulation section (a light modulation element) provided to the projector 20, and the pixel of the projection image corresponds to the pixel of the light modulation section.

Hereinafter, the pixel displayed on the screen SCR and corresponding to the pixel of the light modulation section is referred to as a display pixel. Further, the pixel displayed on the screen SCR and corresponding to the sub-pixel constituting the pixel of the light modulation section is referred to as a display sub-pixel. In this case, the display pixel is composed of the display sub-pixels. In other words, the sub-pixel is a dot with a single color (a domain of a liquid crystal element in the light modulation section) constituting the pixel, and is also called a subpixel or a dot.

The image processing section 200, which corrects the input image signals so as to suppress the generation of the false colors caused by the misalignment of the display positions on the screen SCR of the display sub-pixels, includes a misalignment amount storage section 210, a lens-shift amount acquisition section 220, and an image signal correction section 230.

The misalignment amount storage section 210 stores the amounts of misalignment of the display positions of the display sub-pixels corresponding to the sub-pixels at a plurality of reference positions in the display screen on the screen SCR displayed by the image display section 100 (the projector 200) correspondingly to an amount of shift (a lens-shift amount) of the projection lens (the lens) involved in the image display section 100. For example, the amount of misalignment is stored to the misalignment amount storage section 210 by a given pixel measurement section as a value corresponding to a measurement result of the pixel at the reference position in the display screen on the screen SCR.

The lens-shift amount acquisition section 220 acquires the amount of shift of the projection lens (the lens) involved in the image display section 100. The lens-shift amount acquisition section 220 is capable of acquiring the amount of shift of, for example, an installation surface of the projector 20 or the display screen on the screen SCR in both of the horizontal and vertical directions based on an initial position of the projection lens.

The image signal correction section 230 corrects the image signals corresponding to the sub-pixels constituting each pixel in accordance with the amount of shift acquired by the lens-shift amount acquisition section 220. On this occasion, the image signal correction section 230 corrects the image signals corresponding to the sub-pixels using the amounts of misalignment stored in the misalignment amount storage section 210. More specifically, the image signal correction section 230 calculates the amounts of misalignment of the display positions of the display sub-pixels at given representative points in the display screen on the screen SCR corresponding to the amount of shift based on the amounts of misalignment stored in the misalignment amount storage section 210, obtains the amounts of misalignment of the display positions of the display sub-pixels corresponding to the sub-pixels constituting the present pixel based on the amounts of misalignment thus calculated, and corrects the image signals corresponding to the sub-pixels using the amounts of misalignment of the sub-pixels.

Although the image display section 100 and the image processing section 200 of the projector 20 in the present embodiment will hereinafter be explained assuming that each pixel is composed of the sub-pixel of an R component, the sub-pixel of a G component, and the sub-pixel of a B component, the present embodiment is not limited to a particular number of sub-pixels (the number of color components) constituting each pixel.

Figure 2:
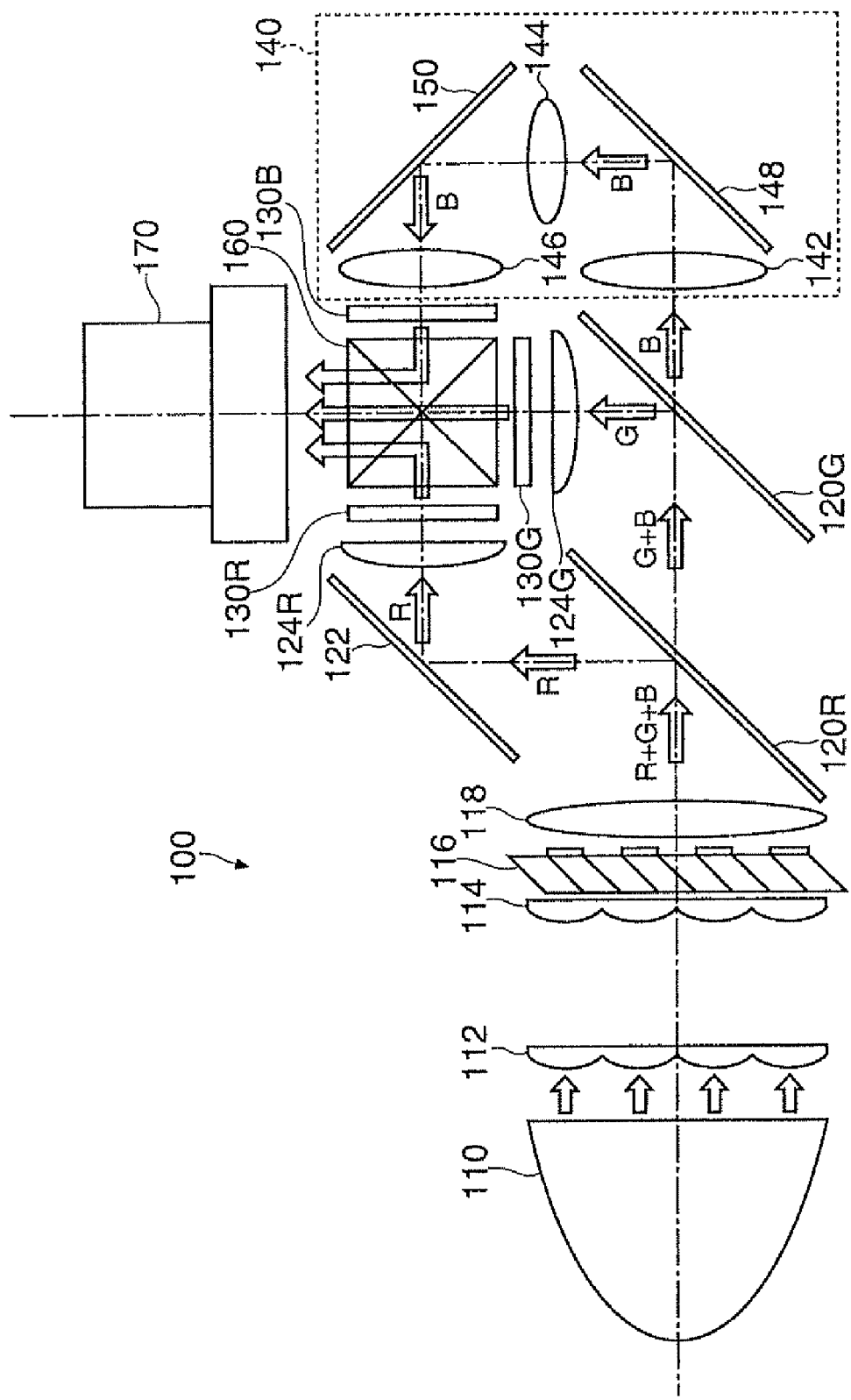
FIG. 2 is a diagram showing a configuration example of the image display section shown in FIG. 1.

FIG. 2 shows a configuration example of the image display section 100 shown in FIG. 1. In FIG. 2, although the explanation is presented assuming that the image display section 100 of the projector 20 in the present embodiment is formed of a so-called three panel liquid crystal projector, the image display section of the image display apparatus according to the invention is not limited to what is formed of a so-called three panel liquid crystal projector.

The image display section 100 includes a light source 110, integrator lenses 112, 114, a polarization conversion element 116, an overlapping lens 118, an R dichroic mirror 120R, a G dichroic mirror 120G, a reflecting mirror 122, an R field lens 124R, a G field lens 124G, an R liquid crystal panel 130R (a first light modulation section), a G liquid crystal panel 130G (a second light modulation section), a B liquid crystal panel 130B (a third light modulation section), a relay optical system 140, a cross dichroic prism 160, and a projection lens 170. Liquid crystal panels used as the R liquid crystal panel 130R, the G liquid crystal panel 130G, and the B liquid crystal panel 130B are transmissive liquid crystal display devices. The relay optical system 140 includes relay lenses 142, 144, 146, and reflecting mirrors 148, 150.

The light source 110 is formed of, for example, a super high-pressure mercury lamp, and emits a light beam including at least an R component light beam, a G component light beam, and a B component light beam. The integrator lens 112 has a plurality of small lenses for dividing the light beam from the light source 110 into a plurality of partial light beams. The integrator lens 114 has a plurality of small lenses corresponding respectively to the small lenses of the integrator lens 112. The overlapping lens 118 overlaps the partial light beams emitted from the small lenses of the integrator lens 112.

Further, the polarization conversion element 116 has a polarization splitting film and a λ/2 plate, and converts p-polarized light into s-polarized light by transmitting the p-polarized light while reflecting the s-polarized light. The s-polarized light beams from the polarization conversion element 116 are applied to the overlapping lens 118.

The light beam overlapped by the overlapping lens 118 enters the R dichroic mirror 120R. The R dichroic mirror 120R has a function of reflecting the R component light beam while transmitting the G component light beam and the B component light beam. The light beam transmitted through the R dichroic mirror 120R is applied to the G dichroic mirror 120G, and the light beam reflected by the R dichroic mirror 120R is reflected by the reflecting mirror 122 to be guided to the R field lens 124R.

The G dichroic mirror 120G has a function of reflecting the G component light beam while transmitting the B component light beam. The light beam transmitted through the G dichroic mirror 120G enters the relay optical system 140, while the light beam reflected by the G dichroic mirror 120G is guided to the G field lens 124G.

The relay optical system 140 corrects the difference in optical path length between the B component light beam transmitted through the G dichroic mirror 120G and the other light beams, namely the R component light beam and the G component light beam, using the relay lenses 142, 144, 146 in order for reducing the difference in the optical path length as much as possible. The light beam transmitted through the relay lens 142 is guided by the reflecting mirror 148 to the relay lens 144. The light beam transmitted through the relay lens 144 is guided by the reflecting mirror 150 to the relay lens 146. The light beam transmitted through the relay lens 146 is applied to the B liquid crystal panel 130B.

The light beam applied to the R field lens 124R is converted into a collimated light beam, and input to the R liquid crystal panel 130R. The R liquid crystal panel 130R functions as the light modulation element (the light modulation section), and is arranged to vary the transmission (penetration, or modulation rate) in accordance with the R image signal. Therefore, the light beam (a first color component light beam) input to the R liquid crystal panel 130R is modulated in accordance with the R image signal, and the light beam thus modulated is input to the cross dichroic prism 160.

The light beam applied to the G field lens 124G is converted into a collimated light beam, and input to the G liquid crystal panel 130G. The G liquid crystal panel 130G functions as the light modulation element (the light modulation section), and is arranged to vary the transmission (penetration, or modulation rate) in accordance with the G image signal. Therefore, the light beam (a second color component light beam) input to the G liquid crystal panel 130G is modulated in accordance with the G image signal, and the light beam thus modulated is input to the cross dichroic prism 160.

The B liquid crystal panel 130B, which is irradiated with the light beam converted by the relay lenses 142, 144, and 146 into the collimated light beam, functions as the light modulation element (the light conversion section), and arranged to vary the transmission (penetration, or modulation rate) in accordance with the B image signal. Therefore, the light beam (a third color component light beam) input to the B liquid crystal panel 130B is modulated in accordance with the B image signal, and the light beam thus modulated is input to the cross dichroic prism 160.

The R liquid crystal panel 130R, the G liquid crystal panel 130G, and the B liquid crystal panel 130B each have substantially the same configuration. The liquid crystal panels are each obtained by encapsulating a liquid crystal material as an electro-optic material between a pair of transparent glass plates, and modulate the penetration of the light beams of the respective colors in accordance with the image signals of the sub-pixels using, for example, poly-silicon thin film transistors as switching elements.

In the present embodiment, the liquid crystal panel as the light modulation section is provided for each of the color components constituting each pixel, and the transmission of the liquid crystal panels is controlled by the image signals corresponding to the respective sub-pixels. Specifically, the image signal for the sub-pixel of the R component is used for controlling the transmission (penetration, or modulation rate) of the R liquid crystal panel 130R, the image signal for the sub-pixel of the G component is used for controlling the transmission of the G liquid crystal panel 130G, and the image signal for the sub-pixel of the B component is used for controlling the transmission of the B liquid crystal panel 130B. In the projector 20 in the present embodiment, the image signals for the respective color components are corrected, and the image signals thus corrected are supplied to the respective liquid crystal panels provided for the respective color components, thus the transmission is controlled in the respective liquid crystal panels.

The cross dichroic prism 160 has a function of outputting the composite light beam as an output light beam, which is obtained by combining the incident light beams from the R liquid crystal panel 130R, the G liquid crystal panel 130G, and the B liquid crystal panel 130B. The projection lens 170 is a lens for enlargedly imaging the output image on the screen SCR, and the amount of modulation of the light beam passing therethrough is controlled in accordance with the image signals from the image processing section 200. Further, the image display section 100 has a lens shift function using the projection lens 170.

Figure 3A:
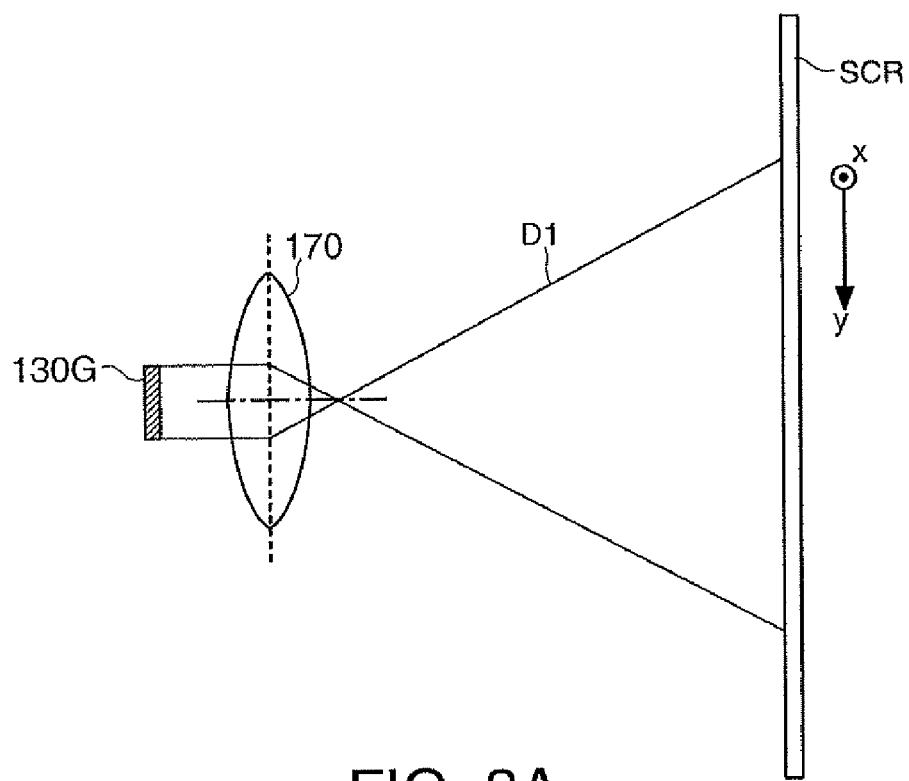
FIGS. 3A and 3B are diagrams for explaining a lens shift function in the present embodiment.
Figure 3B:
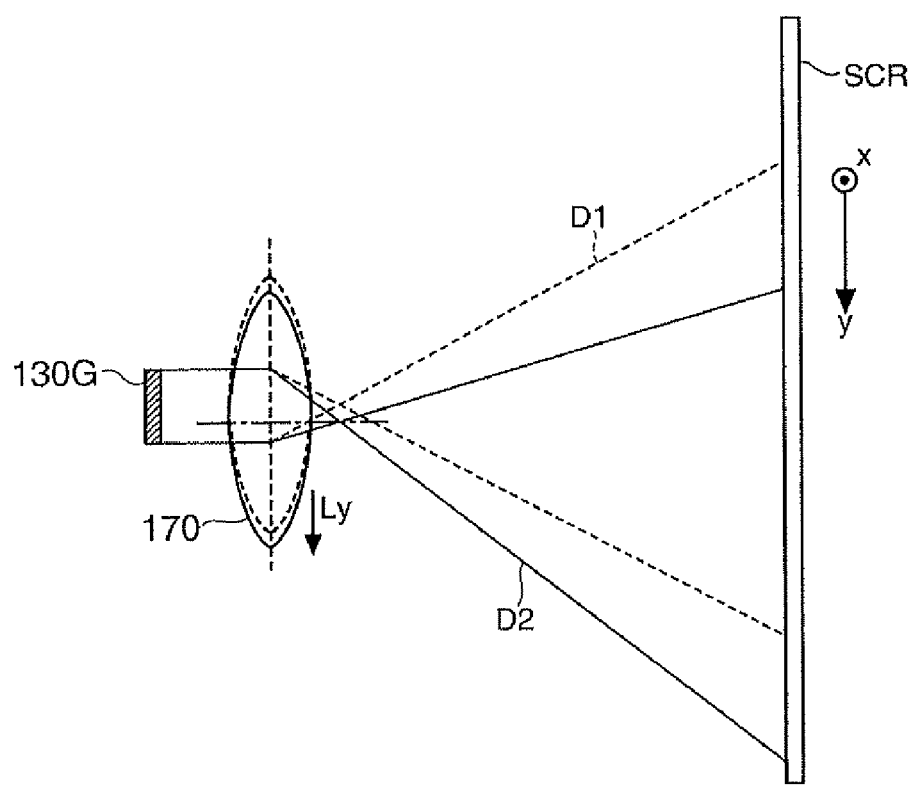

FIGS. 3A and 3B are diagrams for explaining the lens shift function in the present embodiment. FIGS. 3A and 3B are schematic lateral views of the passing light beam passing through the projection lens 170 of the image display section 100. Specifically, assuming that the vertical direction of the display screen on the screen SCR is y, and the horizontal direction thereof is x, FIGS. 3A and 3B are the schematic views from the axial direction in the x direction. FIG. 3A represents a display image on the screen SCR when the projection lens 170 is located at the initial position, and FIG. 3B represents a display image on the screen SCR after the projection lens 170 is shifted. In FIGS. 3A and 3B, the projection lens 170 and the G liquid crystal panel 130G are only shown, and the other constituents are omitted from illustration.

It is assumed that the state in which the center axis of the panel surface of the G liquid crystal panel 130G is arranged to pass through an approximately central part of the projection lens 170 corresponds to the initial position of the projection lens 170. In this case, the image is displayed at the position on the screen SCR shown in FIG. 3A by the light beam modulated by the G liquid crystal panel 130G. The position of the projection lens 170 can be shifted, for example, in the positive direction and the negative direction of the y-axis while fixing the position of the G liquid crystal panel 130G. When the projection lens 170 is shifted a shift amount Ly, the direction of the light beam modulated by the G liquid crystal panel 130G is changed by the projection lens 170 from the direction D1 to the direction D2, and the light beam is projected at the position on the screen SCR shown in FIG. 3B, for example. In other words, the display position of the image on the screen SCR can be changed in the y direction by simply shifting the position of the projection lens 170 in the y direction of the display image on the screen SCR.

It is arranged that the amount of shift of the position of the projection lens 170 is changed manually by the user or electrically in accordance with an instruction of the user of the projector 20, and it is also arranged that the lens-shift amount acquisition section 220 of the image processing section 200 can acquire the position of the projection lens 170, which has been shifted, detected by a sensor or the like, not shown, of the image display section 100, or the position (the amount of shift) thereof thus shifted based on the initial position described above.

It should be noted that although the case in which the projection lens 170 is shifted in the y direction of the display image is explained with reference to FIGS. 3A and 3B, the same applies to the x direction of the display image. Further, although FIGS. 3A and 3B show only the G liquid crystal panel 130G, the same applies to the R liquid crystal panel 130R and the B liquid crystal panel 130B.

Each of the sections of the image processing section 200 shown in FIG. 1 will hereinafter be explained.

Every certain amount of shift of the projection lens 170, the misalignment amount storage section 210 stores the amount misalignment of the display positions of the display sub-pixels corresponding to the sub-pixels at the plurality of reference positions in the display screen on the screen SCR. At least two reference positions in the display screen are enough, and the larger the number of reference positions is, the more accurately the image signals can be corrected on the one hand, the larger the data size of the amounts of misalignment to be stored in the misalignment amount storage section 210 becomes on the other hand. Therefore, it is arranged that the four reference positions are provided in the display screen, and the misalignment amount storage section 210 in the present embodiment calculates the amounts of misalignment of the rest of the pixel positions by an interpolation processing using the amounts of misalignment at the reference positions.

Figure 4:
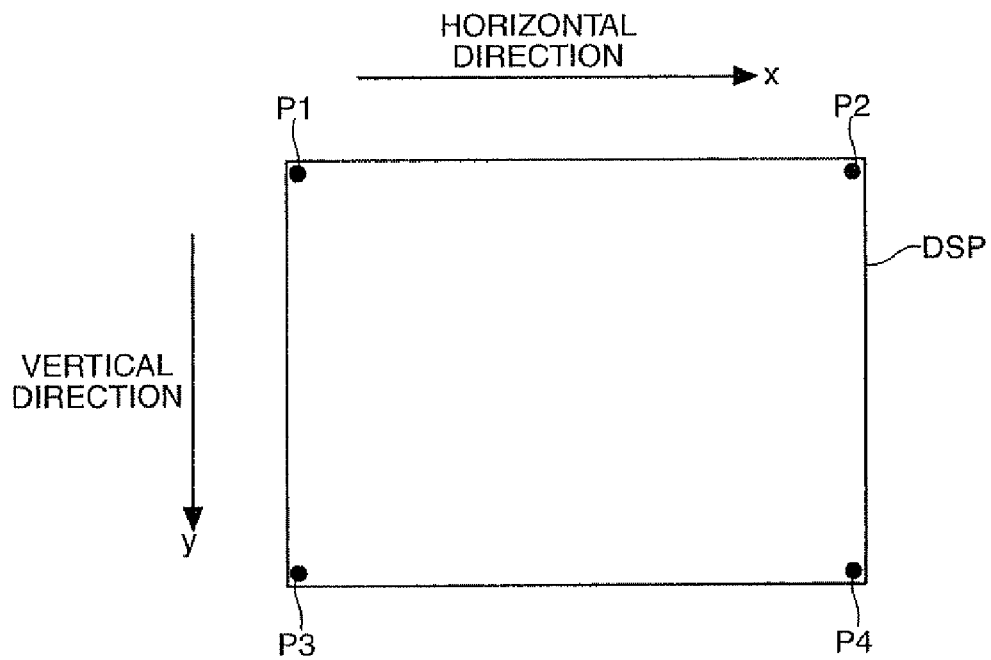
FIG. 4 is a diagram for explaining reference positions in the present embodiment.
Figure 5:
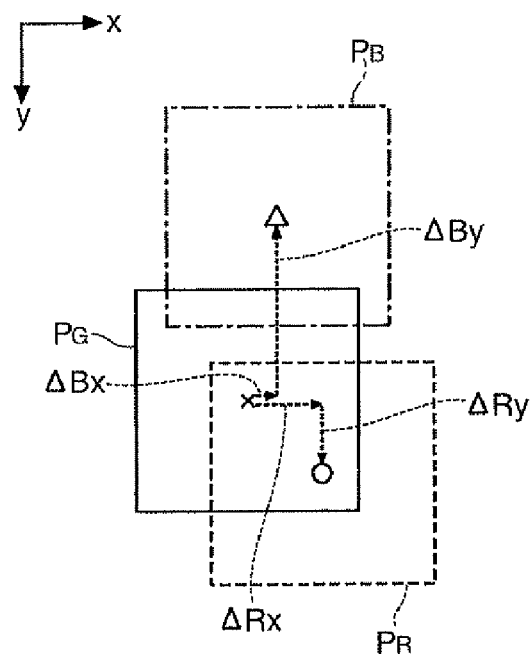
FIG. 5 is a diagram for explaining amounts of misalignment to be stored to a misalignment amount storage section in the present embodiment.

FIGS. 4 and 5 are diagrams for explaining the misalignment amount storage section 210. FIG. 4 is a diagram for explaining the reference positions in the present embodiment. FIG. 5 shows the amounts of misalignment stored in the misalignment amount storage section 210 in the present embodiment.

As shown in FIG. 4, the reference positions correspond to first through fourth pixel positions P1 through P4 in the display screen DSP on the screen SCR by the projector 20. Specifically, the misalignment amount storage section 210 stores the amounts of misalignment at each of the pixel positions, namely the first pixel position P1 at the upper left end of the display screen DSP, the second pixel position P2 at the upper right end thereof, the third pixel position P3 at the lower left end thereof, and the fourth pixel position P4 at the lower right end thereof. The amounts of misalignment of the display sub-pixels at the other pixel positions in the display screen DSP are obtained by interpolating the amounts of misalignment at the first through fourth pixel positions P1 through P4 stored in the misalignment amount storage section 210. According to the process described above, it becomes possible to accurately correct the image signals of the sub-pixels corresponding to the display sub-pixels at any pixel position in the display screen with a little process load without storing a lot of amounts of misalignment in the misalignment amount storage section 210.

In order for specifying the amounts of misalignment of the sub-pixels constituting one pixel at each of the reference positions shown in FIG. 4, the misalignment amount storage section 210 stores, based on the display position of the display sub-pixel corresponding to the sub-pixel of the G component, the amounts of misalignment of the display positions of the display sub-pixels corresponding to the sub-pixels of the other color components.

In other words, as shown in FIG. 5, in the case in which each pixel is composed of the sub-pixel of the R component, the sub-pixel of the G component, and the sub-pixel of the B component, the display pixel is composed of the display sub-pixel $P_R$ corresponding to the sub-pixel of the R component, the display sub-pixel $P_G$ corresponding to the sub-pixel of the G component, and the display sub-pixel $P_B$ corresponding to the sub-pixel of the B component. In FIG. 5, illustration is presented assuming that each of the display sub-pixels has a rectangular shape in a schematic manner. Every reference position, based on a luminescent spot located at the center of the display sub-pixel $P_G$ of the G component, the misalignment amount storage section 210 stores the amount of misalignment $\Delta Rx$ to the luminescent spot located at the center of the display sub-pixel $P_R$ of the R component in the x direction and the amount of misalignment $\Delta Ry$ thereto in the y direction, and the amount of misalignment $\Delta Bx$ to the luminescent spot located at the center of the display sub-pixel $P_B$ of the B component in the x direction and the amount of misalignment $\Delta By$ thereto in the y direction.

Thus, the storage capacity of the misalignment amount storage section 210 can be reduced, and it becomes possible to achieve cost reduction of the image processing section 200 and the projector 20 including the image processing section 200. Moreover, since the image signals corresponding to the sub-pixels of the R component and the B component are corrected in accordance with the display position of the display sub-pixel corresponding to the sub-pixel of the G component, the correction process for the image signal corresponding to the sub-pixel of the G component can be eliminated. Further, by taking the G component as the reference, which can easily be recognized by the human eyes, the process using the amount of misalignment can be made easy to deal with.

Then, the misalignment amount storage section 210 stores the amounts of misalignment shown in FIG. 5 every reference position shown in FIG. 4 and every certain amount of shift of the projection lens 170.

Figure 6:
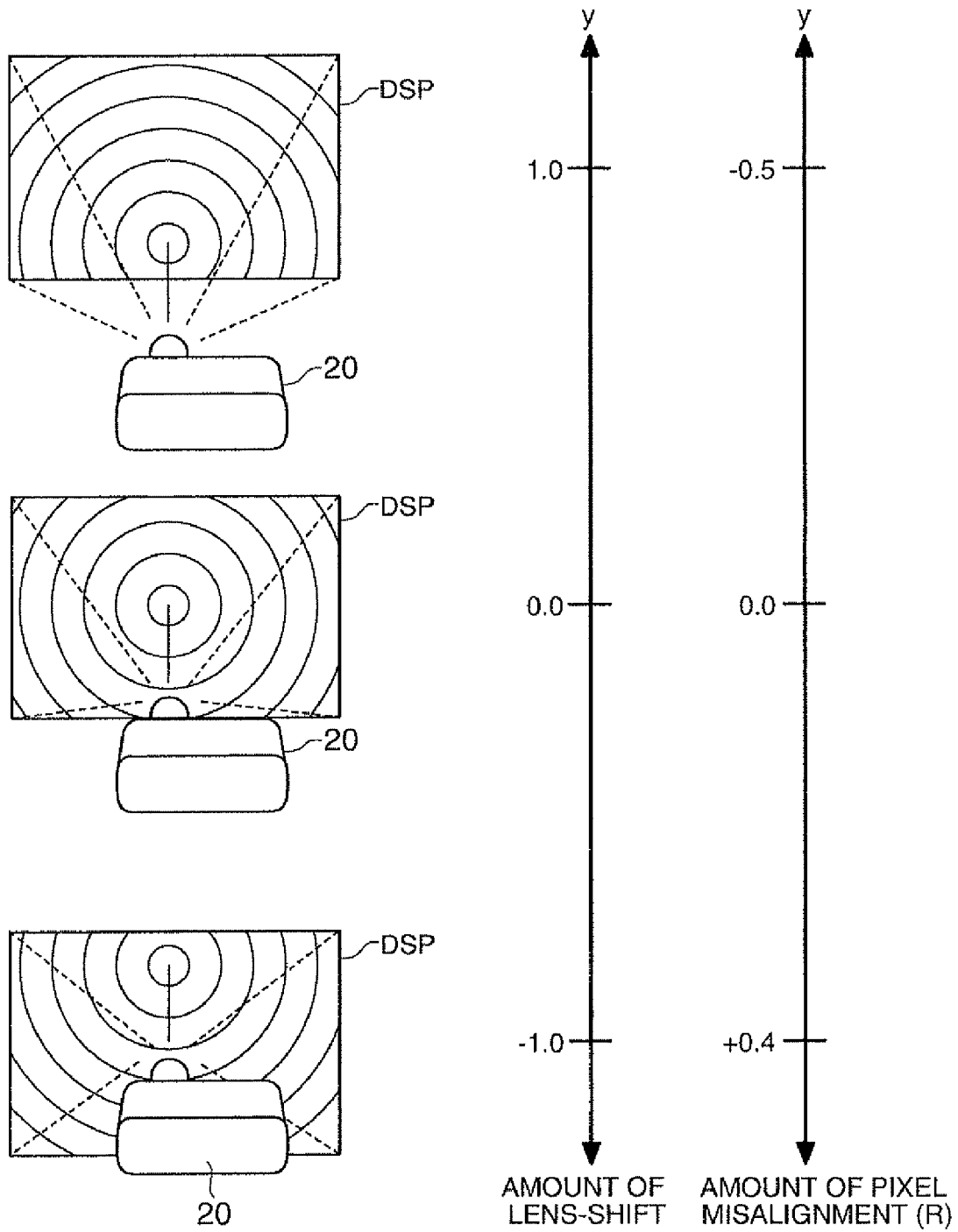
FIG. 6 is a diagram for explaining the misalignment amount storage section for storing the amounts of misalignment every certain amount of shift of a projection lens.

FIG. 6 is a diagram for explaining the misalignment amount storage section 210 for storing the amount of misalignment every certain amount of shift of the projection lens 170. FIG. 6 represents a diagram for explaining the amount of misalignment of the display sub-pixel of the R component in the y direction shown in FIG. 4, stored every certain amount of shift of the projection lens 170.

Assuming that the maximum amount of shift of the projection lens 170 in the positive direction of the y direction is "1.0," the maximum amount of shift thereof in the negative direction of the y direction is "−1.0," and the amount of shift of the projection lens 170 at the initial position in the y direction is "0.0," the amounts of misalignment (see FIG. 5) at each of the four reference positions shown in FIG. 4 are stored in the misalignment amount storage section 210 for each of the three amounts of shift in the y direction, in the present embodiment.

For example, FIG. 6 shows that in the case in which the amount of shift is "1.0," the measurement value of the amount of misalignment of the display position of the display sub-pixel of the R component constituting the pixel at the reference position P1 shown in FIG. 4 is "−0.5." Similarly, FIG. 6 shows that in the case in which the amount of shift is "0.0," the measurement value of the amount of misalignment of the display position of the display sub-pixel of the R component constituting the pixel at the reference position P1 shown in FIG. 4 is "−0.0." Further, FIG. 6 shows that in the case in which the amount of shift is "−1.0," the measurement value of the amount of misalignment of the display position of the display sub-pixel of the R component constituting the pixel at the reference position P1 shown in FIG. 4 is "+0.4." In FIG. 6, the amounts of misalignment of the display position of the display sub-pixel of the R component are based on the display position of the display sub-pixel of the G component constituting the pixel at the reference position P1. Such amounts of misalignment of the display positions of the display sub-pixels are acquired using a display pixel position measurement method known to the public. The amounts of misalignment of the display positions of the display sub-pixels in the case with the other amounts of shift among the amounts of shift of the projection lens 170 are obtained by interpolating the amounts of misalignment corresponding to any of the amounts of shift "1.0," "0.0," and "−1.0."

Although the amounts of misalignment of the R component in the y direction are only explained with reference to FIG. 6, the same applies to the amounts of misalignment of the R component in the x direction. Further, regarding the B component, the amounts of misalignment in both of the x direction and the y direction are stored in the misalignment amount storage section 210 for each of the amounts of shift described above.

FIG. 7 is a diagram showing an example of the amounts of misalignment stored in the misalignment amount storage section 210. In FIG. 7, among components of the amount of shift (the amount of lens-shift) of the projection lens 170, the amount of shift of the x direction component is described as Lx, and the amount of shift of the y direction component is described as Ly. Further, in FIG. 7, among the amounts of misalignment of the display sub-pixels at each of the pixel positions, namely the first through fourth pixel positions P1 through P4, the amount of misalignment of the display position of the display sub-pixel of the R component is described as $\Delta R$, and the amount of misalignment of the display position of the display sub-pixel of the B component is described as $\Delta B$.

For example, correspondingly to the amount of shift of the projection lens 170 with the amount of shift Lx of the x direction of "−1.0" and the amount of shift Ly of the y direction of "1.0," the amount of misalignment $\Delta R11x$ of the display position of the display sub-pixel of the x direction of the R component constituting the display pixel at the first pixel position P1, and the amount of misalignment $\Delta R11y$ of the display position of the display sub-pixel of the y direction of the R component constituting the same display pixel are stored to the misalignment amount storage section 210 based on the display position of the display sub-pixel of the G component constituting the same display pixel. Further, correspondingly to this combination of the amounts of shift Lx, Ly, the amount of misalignment $\Delta B11x$ of the display position of the display sub-pixel of the x direction of the B component constituting the display pixel at the first pixel position P1, and the amount of misalignment $\Delta B11y$ of the display position of the display sub-pixel of the y direction of the B component constituting the same display pixel are stored to the misalignment amount storage section 210 based on the display position of the display sub-pixel of the G component constituting the same display pixel.

Correspondingly to the combination of the amount of shift Lx of "−1.0" and the amount of shift Ly of "1.0" of the projection lens 170, the amounts of misalignment of the display positions of the display sub-pixels of the R component and the B component are stored with respect to the second through fourth pixel positions P2 through P4 in a similar manner.

Further, every combination of the amounts of shift Lx, Ly of the projection lens 170, such amounts of misalignment of the display positions of the display sub-pixels of the R component and the B component constituting the display pixel at each of the first through fourth pixel positions P1 through P4 are stored to the misalignment amount storage section 210.

Hereinafter, the image signal correction section 230 for correcting the input image signals based on the amounts of misalignment stored in such a misalignment amount storage section 210 will be explained.

Figure 8:
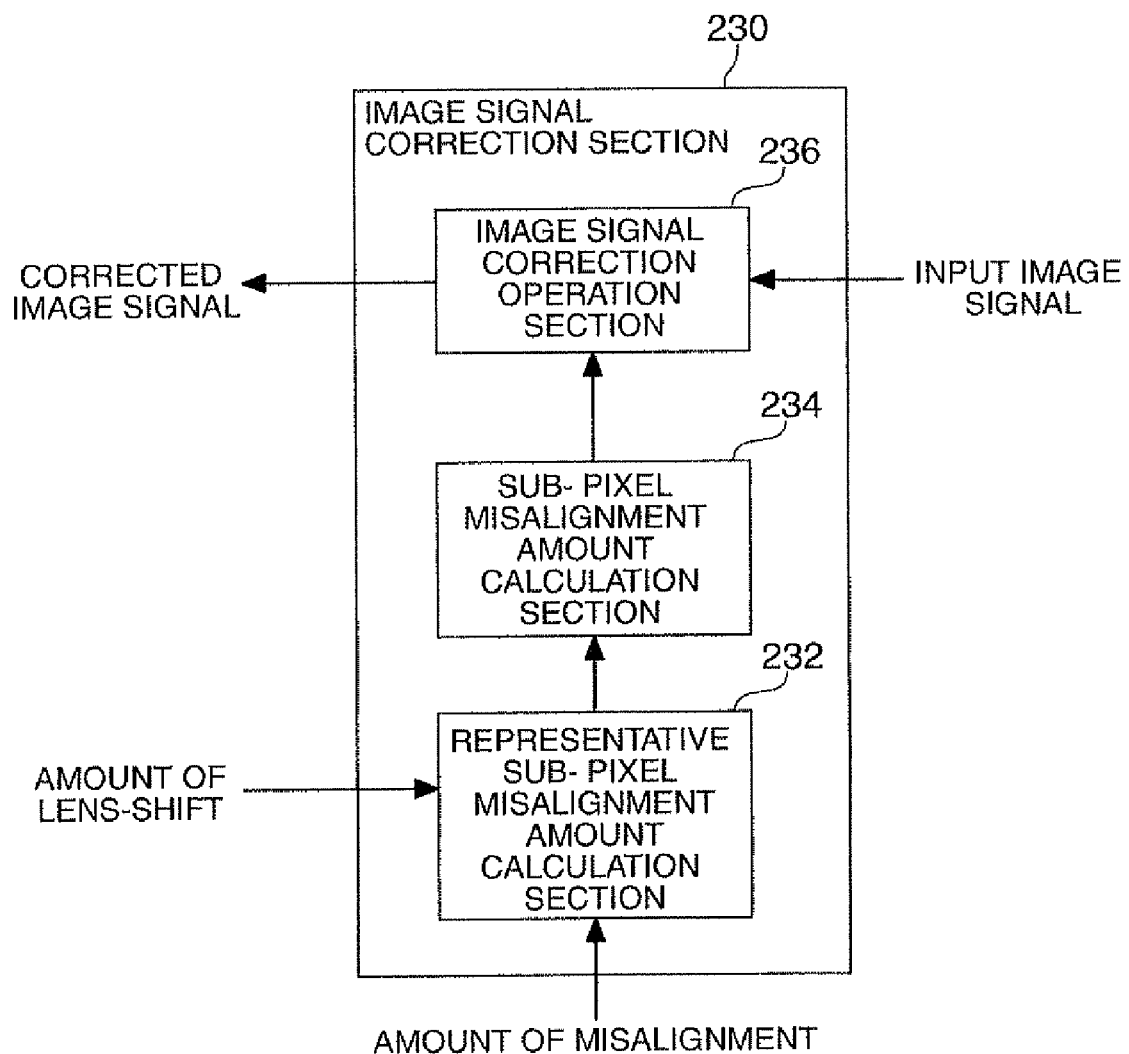
FIG. 8 is a block diagram of a configuration example of the image signal correction section shown in FIG. 2.

FIG. 8 is a block diagram of a configuration example of the image signal correction section 230 shown in FIG. 2.

The image signal correction section 230 includes a representative sub-pixel misalignment amount calculation section 232, a sub-pixel misalignment amount calculation section 234, and an image signal correction operation section 236.

Based on the amounts of misalignment stored in the misalignment amount storage section 210, the representative sub-pixel misalignment amount calculation section 232 calculates the amounts of misalignment of the display positions of the display sub-pixels constituting the display pixel at given representative points in the display screen DSP corresponding to the amounts of shift.

The sub-pixel misalignment calculation section 234 obtains the amounts of misalignment of the display positions of the sub-pixels constituting the present pixel based on the amounts of misalignment stored in the misalignment amount storage section 210. More specifically, based on the amounts of misalignment of the display positions of the display sub-pixels at the representative points calculated by the representative sub-pixel misalignment amount calculation section 232, the sub-pixel misalignment amount calculation section 234 obtains the amounts of misalignment of the display positions of the display sub-pixels corresponding to the sub-pixels constituting the present pixel.

Based on the amounts of misalignment of the display positions of the display sub-pixels corresponding to the sub-pixels constituting the present pixel obtained based on the amounts of misalignment at the representative points calculated by the representative sub-pixel misalignment amount calculation section 232, the image signal correction operation section 236 corrects the image signals corresponding to the sub-pixels. More specifically, the image signal correction operation section 236 corrects the image signals corresponding to the sub-pixels constituting the present pixel based on the amounts of misalignment calculated by the sub-pixel misalignment amount calculation section 234.

It should be noted here that the representative points correspond to the pixel position at the upper left end of the display screen DSP displayed with a given amount of shift of the projection lens 170, the pixel position at the upper right end thereof, the pixel position at the lower left end thereof, and the pixel position at the lower right end thereof. It should also be noted that the present embodiment is not limited to the pixel positions of the representative points, any pixel positions from which the amounts of misalignment of the display positions of the display sub-pixels corresponding to the sub-pixels constituting the present pixel are calculated can also be adopted. According to the process described above, it becomes possible to accurately correct the image signal of the sub-pixels corresponding to the display sub-pixels at any pixel position in the display screen with a little process load without storing a lot of amounts of misalignment in the misalignment amount storage section 210.

Thus, it becomes possible to prevent degradation of the image quality due to the misalignment of the display positions of the sub-pixels constituting each pixel caused in accordance with the amount of shift of the projection lens 170. In other words, despite the fact that higher accuracy is required for the aberration accuracy of the optical system provided to the projector 20 due to the lens shift function, even if the accurate adjustment of all of the display positions of the sub-pixels constituting each pixel is not achievable, since the image signals can be corrected based on the amounts of misalignment of the display positions of the display sub-pixels corresponding respectively to the sub-pixels correspondingly to the amount of shift, it becomes possible to prevent the degradation of the image quality caused by the misalignment of the display positions of the display sub-pixels corresponding to the sub-pixels at low cost.

Hereinafter, a processing example of the image processing section 200 capable of performing such a correction of the image signals will be explained in detail. It is possible to realize the function of the image processing section 200 by hardware, or by software. Hereinafter, it is assumed that the function of the image processing section 200 is realized by a software process.

Figure 9:
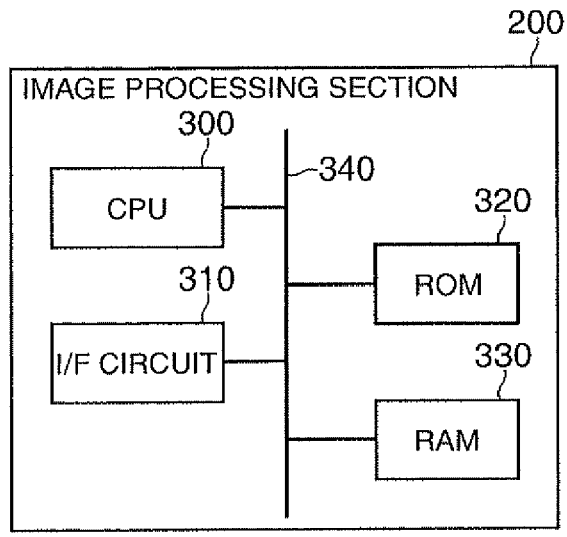
FIG. 9 is a block diagram of a hardware configuration example of the image processing section shown in FIG. 1.

FIG. 9 is a block diagram of a hardware configuration example of the image processing section 200 shown in FIG. 1.

The image processing section 200 has a CPU 300, an I/F circuit 310, a read only memory (ROM) 320, a random access memory (RAM) 330, and a bus 340, and the CPU 300, the I/F circuit 310, the ROM 320, and the RAM 330 are electrically connected to each other via the bus 340.

For example, the ROM 320 or the RAM 330 stores a program for realizing the function of the image processing section 200. The CPU 300 reads out the program stored in the ROM 320 or the RAM 330 to execute the process corresponding to the program, thereby realizing the function of the image processing section 200 described above with the software process. Specifically, the function of each section of the image processing section 200 shown in FIG. 1 is realized by the CPU 300 reading the program stored in the RON 320 or the RAM 330 and performing the process corresponding to the program. It should be noted that the RAM 330 is used as a working area for the process by the CPU 300, realizes the function of the misalignment amount storage section 210, and is used as a buffer area of the I/F circuit 310 and the ROM 320. Further, it is also possible that the ROM 320 realizes the function of the misalignment amount storage section 210 shown in FIG. 1. The I/F circuit 310 executes an input interface process of the image signals from the image signal generation device not shown, and an input interface process of the amounts of shift of the projection lens 170 from the image processing section 200.

Figure 10:
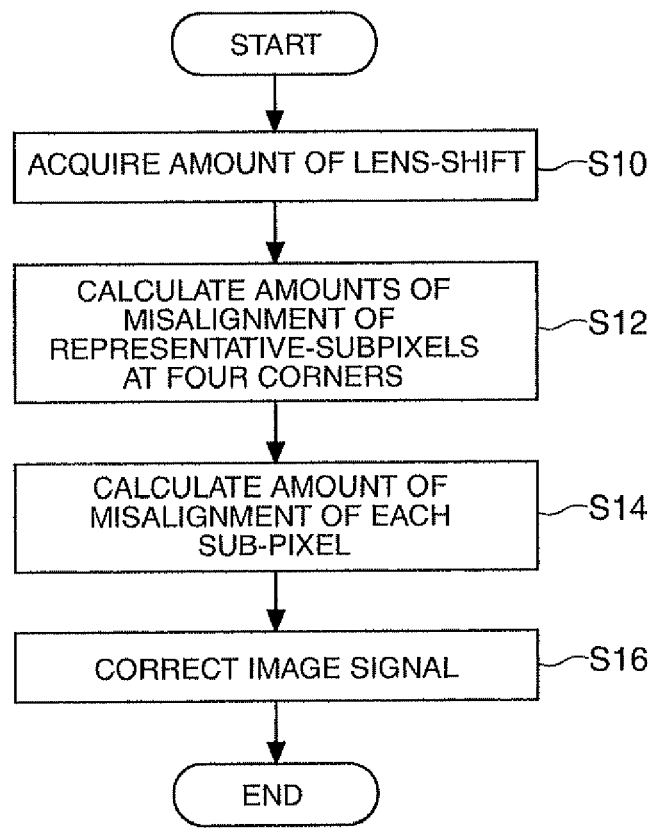
FIG. 10 is a flowchart of a processing example of the image processing section shown in FIG. 1.

FIG. 10 is a flowchart of a processing example of the image processing section 200 shown in FIG. 1. The ROM 320 or the RAM 330 shown in FIG. 9, for example, stores the program for realizing the process shown in FIG. 10, and the process shown in FIG. 10 can be realized as the software process by the CPU 300 reading out the program stored in the ROM 320 or the RAM 330 to execute the process corresponding to the program.

Prior to the process shown in FIG. 10, the misalignment amount storage section 210 stores the amounts of misalignment of the display sub-pixels constituting the display pixels at the reference positions explained above with reference to FIG. 4, correspondingly to the amounts of shift of the projection lens 170.

Firstly, the image processing section 200 acquires (step S10) the amount of shift of the projection lens 170 in the image display section 100 in the lens-shift amount acquisition section 220 as the lens-shift amount acquisition step.

Then, taking the four corners of the display screen on the screen SCR as the representative points, the image processing section 200 calculates (step S12) amounts of misalignment of the display sub-pixels constituting the display pixel at each of the representative points based on the amounts of misalignment stored in the misalignment amount storage section 210 correspondingly to the amount of shift acquired by the lens-shift amount acquisition section 220 in the representative sub-pixel misalignment amount calculation section 232 of the image signal correction section 230 as the representative sub-pixel misalignment amount calculation step.

Then, based on the amounts of misalignment of the display sub-pixels at the representative points calculated by the representative sub-pixel misalignment amount calculation section 232, the image processing section 200 calculates (step S14) the amounts of misalignment of the display sub-pixels corresponding to the sub-pixels constituting the present pixel in the sub-pixel misalignment amount calculation section 234 of the image signal correction section 230 as the sub-pixel misalignment amount calculation step.

Subsequently, based on the amounts of misalignment of the display sub-pixels corresponding to the sub-pixels constituting the present pixel calculated by the sub-pixel misalignment amount calculation section 234, the image processing section 200 corrects (step S16) the image signals corresponding to the sub-pixels constituting the present pixel in the image signal correction operation section 236 of the image signal correction section 230 as the image signal correction step, and terminates (END) the series of steps. For example, the step S11 is executed repeatedly for all of the pixels constituting one frame.

Hereinafter, each step of the image processing method shown in FIG. 10 will specifically be explained.

Figure 11:
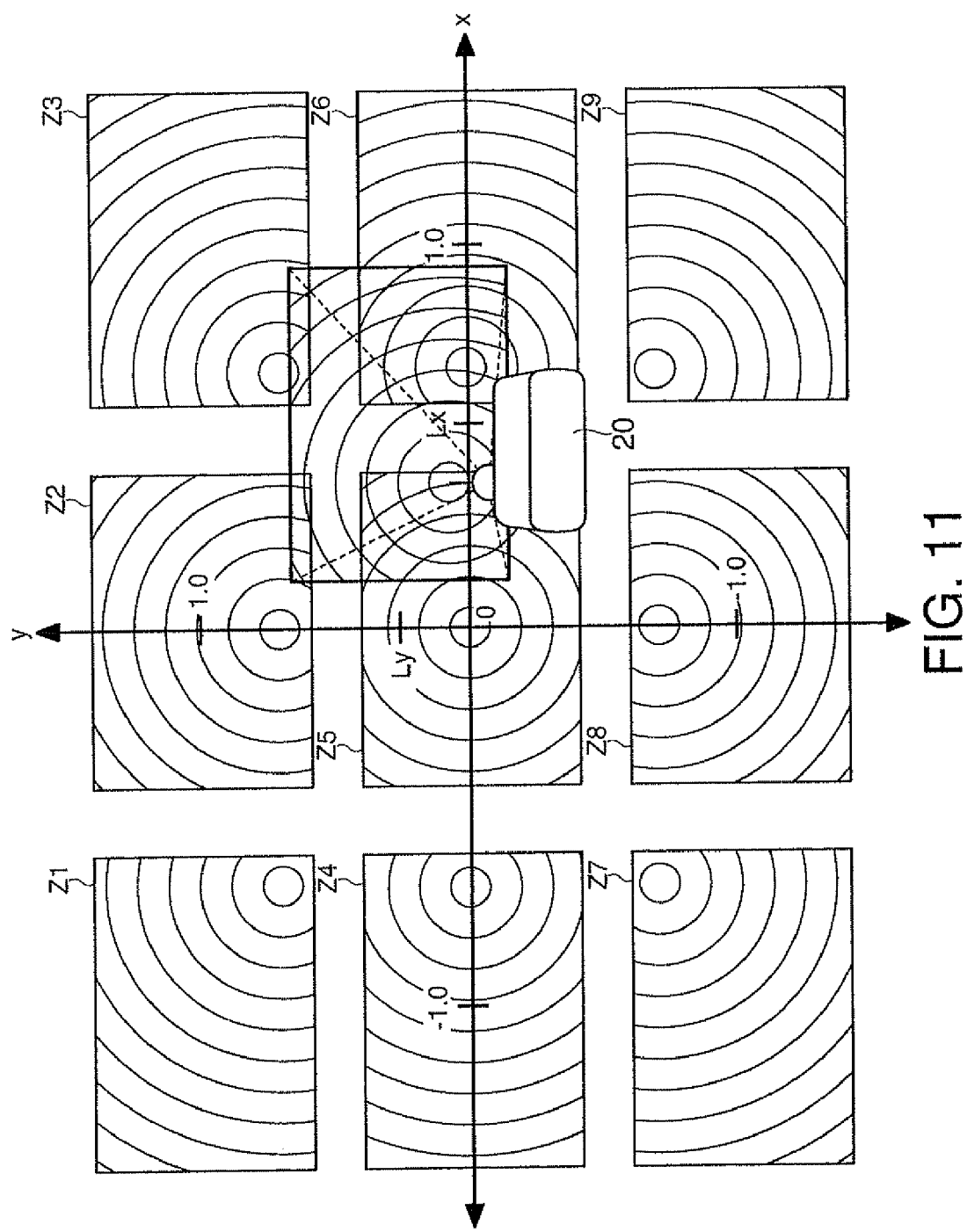
FIG. 11 is a diagram for explaining the step S10 shown in FIG. 10.

FIG. 11 is a diagram for explaining the step S10 shown in FIG. 10. In FIG. 11, the lateral axis represents the amount of shift Lx of the projection lens 170, the vertical axis represents the amount of shift Ly of the projection lens 170, and a group of amounts of misalignment stored in the misalignment amount storage section 210 is schematically shown at each grid-point of the coordinates.

In the step S10, the lens-shift amount acquisition section 220 acquires the amount of shift Lx in the horizontal direction of the display screen on the screen SCR and the amount of shift Ly in the vertical direction thereof. More specifically, the lens-shift amount acquisition section 220 obtains the amounts of shift Lx, Ly each normalized into a value within the range of "−1.0 through 1.0" based on the amounts of lens shift acquired from the image display section 100 including the projection lens 170 as explained with reference to FIG. 6.

In the misalignment amount storage section 210 shown in FIG. 7, Z1 denotes the group of amounts of misalignment stored correspondingly to the amount of shift Lx of "−1.0" and the amount of shift Ly of "1.0," Z2 denotes the group of amounts of misalignment stored correspondingly to the amount of shift Lx of "0.0" and the amount of shift Ly of "1.0," Z3 denotes the group of amounts of misalignment stored correspondingly to the amount of shift Lx of "1.0" and the amount of shift Ly of "1.0," Z4 denotes the group of amounts of misalignment stored correspondingly to the amount of shift Lx of "−1.0" and the amount of shift Ly of "0.0," Z5 denotes the group of amounts of misalignment stored correspondingly to the amount of shift Lx of "0.0" and the amount of shift Ly of "0.0," Z6 denotes the group of amounts of misalignment stored correspondingly to the amount of shift Lx of "1.0" and the amount of shift Ly of "0.0," Z7 denotes the group of amounts of misalignment stored correspondingly to the amount of shift Lx of "−1.0" and the amount of shift Ly of "−1.0," Z8 denotes the group of amounts of misalignment stored correspondingly to the amount of shift Lx of "0.0" and the amount of shift Ly of "−1.0," and Z9 denotes the group of amounts of misalignment stored correspondingly to the amount of shift Lx of "1.0" and the amount of shift Ly of "−1.0." If the amounts of shift Lx, Ly shown in FIG. 11 are acquired, the groups of amounts of misalignment Z2, Z3, Z5, Z6 are used in the posterior process.

Figure 12:
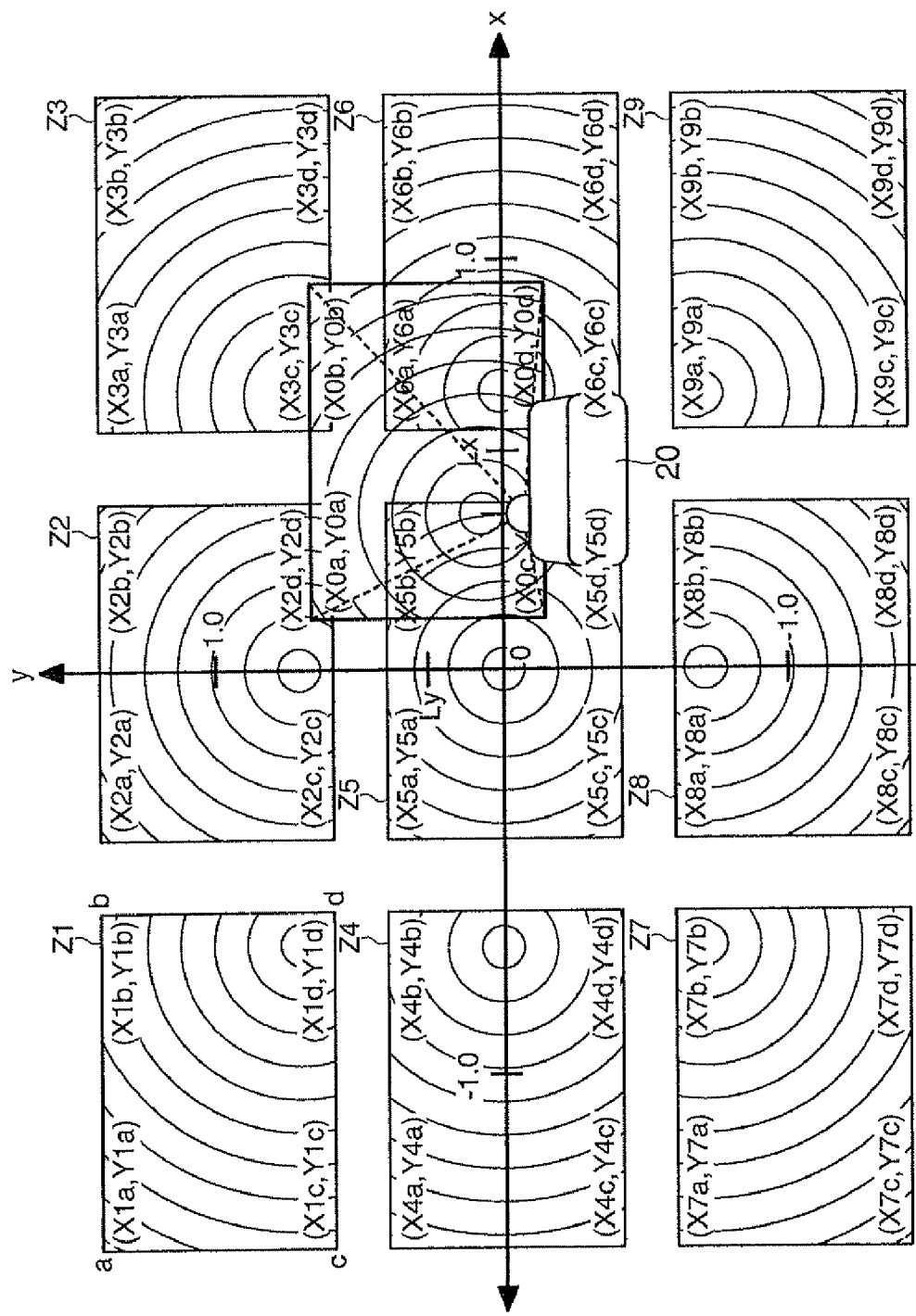
FIG. 12 is a diagram for explaining the step S12 shown in FIG. 10.

FIG. 12 is a diagram for explaining the step S12 shown in FIG. 10. In FIG. 12, the lateral axis represents the amount of shift Lx of the projection lens 170, the vertical axis represents the amount of shift Ly of the projection lens 170, and a group of amounts of misalignment of the display position of the display sub-pixel of the R component stored in the misalignment amount storage section 210 is schematically shown at each grid-point of the coordinates. Specifically, in the group of amounts of misalignment Z1 shown in FIG. 12, X1a corresponds to $\Delta R11x$, Y1a corresponds to $\Delta R11y$, X1b corresponds to $\Delta R21x$, Y1b corresponds to $\Delta R21y$, X1c corresponds to $\Delta R31x$, Y1c corresponds to $\Delta R31y$, X1d corresponds to $\Delta R41x$, and Y1d corresponds to $\Delta R41y$.

In the step S12, a plurality of groups of amounts of misalignment is selected from the groups of amounts of misalignment Z1 through Z9 shown in FIG. 12 based on the amounts of shift Lx, Ly of the projection lens 170 acquired in the step S10. For example, if the amounts of shift Lx, Ly shown in FIG. 12 are acquired, the representative sub-pixel misalignment amount calculation section 232 calculates the amounts of misalignment (X0a, Y0a), (X0b, Y0b), (X0c, Y0c), and (X0d, Y0d) at the pixel positions (the representative points) of the four corners of the display screen using the amounts of misalignment in the groups of amounts of misalignment Z2, Z3, Z5, Z6.

More specifically, the representative sub-pixel misalignment amount calculation section 232 calculates the amounts of misalignment of the display positions of the display sub-pixels constituting the display pixel at each of the pixel positions as the representative points by linear interpolation using the amounts of shift Lx, Ly, and the amounts of misalignment in the groups of amounts of misalignment Z2, Z3, Z5, Z6. For example, the amount of misalignment X0a of the display position of the display sub-pixel of the R component at the representative point at the upper left of the display screen with the amounts of shift Lx, Ly shown in FIG. 12 is calculated by the following formula.

$$X0a=(1-y)\times\{(1-Lx)\times X5a+Lx\times 6a\}+Ly\times\{(1-Lx)\times X2a+Lx\times X3a\} \quad (1)$$

Similarly, the amount of misalignment Y0a of the display position of the display sub-pixel of the R component at the representative point at the upper left of the display screen with the amounts of shift Lx, Ly shown in FIG. 12 is calculated by the following formula.

$$Y0a=(1-Lx)\times\{(1-Ly)\times Y5a+Ly\times Y6a\}+Lx\times\{(1-Ly)\times Y2a+Ly\times Y3a\} \quad (2)$$

The amounts of misalignment at the other representative points shown in FIG. 12 can also be obtained by substantially the same interpolation process. It should be noted that although the case of calculating the amounts of misalignment of the display position of the display sub-pixel of the R component at each of the representative points is explained with reference to FIG. 12, the amounts of misalignment of the display position of the display sub-pixel of the other color component at the representative point can also be calculated in substantially the same manner.

Figure 13:
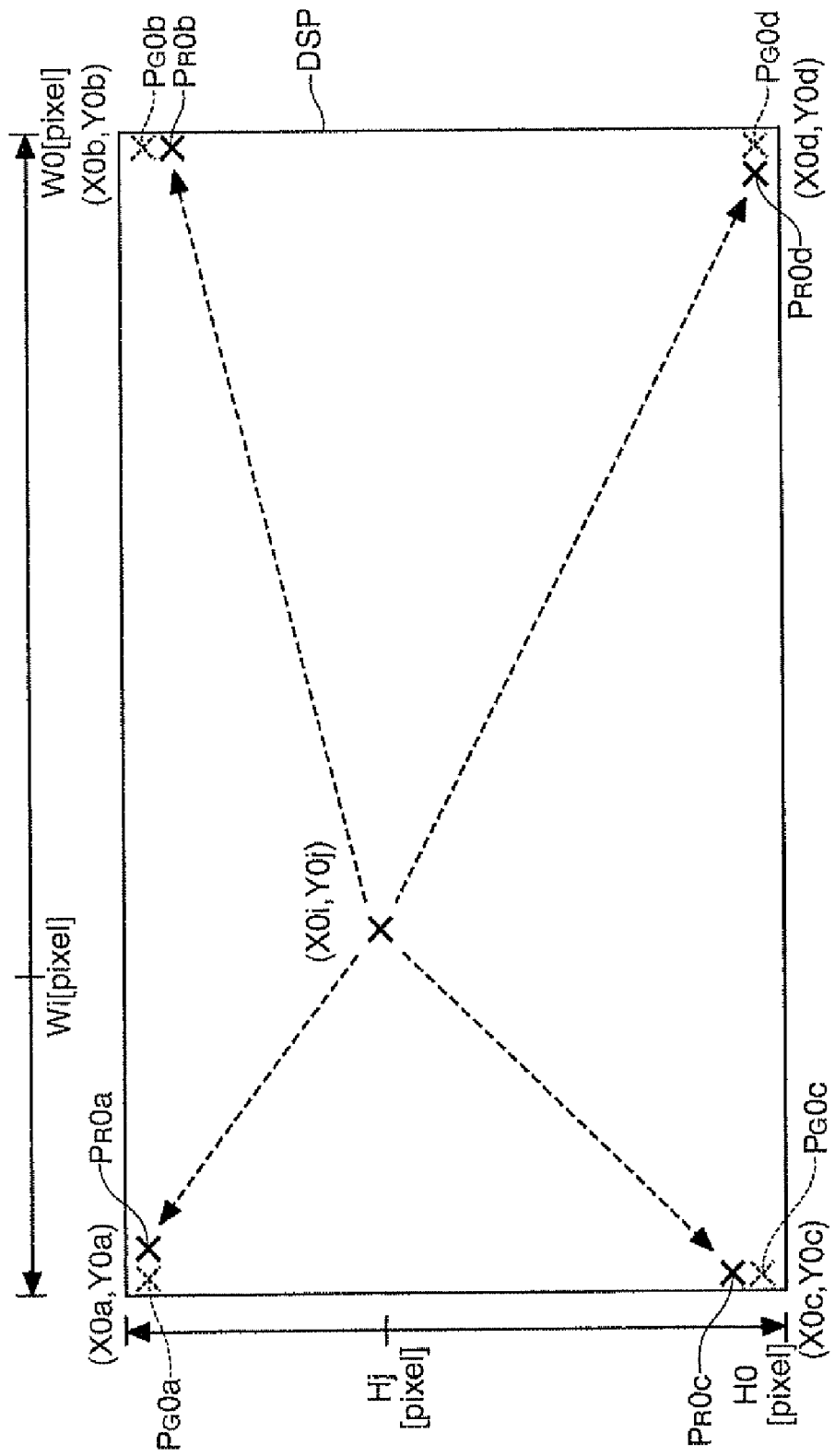
FIG. 13 is a diagram for explaining the step S14 shown in FIG. 10.

FIG. 13 is a diagram for explaining the step S14 shown in FIG. 10. In FIG. 13, it is assumed that the display screen DSP has W0 pixels in the horizontal direction and H0 pixels in the vertical direction, and the amounts of misalignment (X0i, Y0j) of the display position of the display sub-pixel of R component constituting the display pixel located at the With pixel in the horizontal direction of the display screen DSP and the Hjth pixel in the vertical direction thereof are to be calculated. It should be noted here that X0i denotes the amount of misalignment in the horizontal direction of the display screen DSP, and Y0j denotes the amount of misalignment in the vertical direction of the display screen DSP.

When the amounts of misalignment of the display sub-pixels of each of pixel P0a at the upper left of the display screen DSP shown in FIG. 13, pixel P0b at the upper right thereof, pixel P0c at the lower left thereof, and pixel P0d at the lower right thereof are calculated as the representative points, the sub-pixel misalignment amount calculation section 234 obtains the amounts of misalignment of the display sub-pixels constituting the display pixel at the With pixel in the horizontal direction of the display screen DSP and the Hjth pixel in the vertical direction thereof by the interpolation process using the amounts of misalignment of the display sub-pixels at the pixels P0a, P0b, P0c, P0d.

Assuming that the display sub-pixel of the G component constituting the pixel P0a is $P_G0a$, and the display sub-pixel of the R component is $P_R0a$, the amounts of misalignment of the display position of the display sub-pixel $P_R0a$ are the amounts of misalignment based on the display position of the display sub-pixel $P_G0a$. Assuming that the display sub-pixel of the G component constituting the pixel P0b is $P_G0b$, and the display sub-pixel of the R component is $P_R0b$, the amounts of misalignment of the display position of the display sub-pixel $P_R0b$ are the amounts of misalignment based on the display position of the display sub-pixel $P_G0b$. Assuming that the display sub-pixel of the G component constituting the pixel P0c is $P_G0c$, and the display sub-pixel of the R component is $P_R0c$, the amounts of misalignment of the display position of the display sub-pixel $P_R0c$ are the amounts of misalignment based on the display position of the display sub-pixel $P_G0c$. Assuming that the display sub-pixel of the G component constituting the pixel P0d is $P_G0d$, and the display sub-pixel of the R component is $P_R0d$, the amounts of misalignment of the display position of the display sub-pixel $P_R0d$ are the amounts of misalignment based on the display position of the display sub-pixel $P_G0d$.

Therefore, for example, the amount of misalignment X0i of the display sub-pixel of the R component constituting the pixel at the pixel position shown in FIG. 13 is calculated by the following formula.

$$X0i=(1-Hj/H0)\times\{(1-Wi/W0)\times X0a+Wi/W0\times X0b\}+Hj/H0\times\{(1-Wi/W0)\times X0c+Wi/W0\times X0d\} \quad (3)$$

Similarly, the amount of misalignment Y0j of the display sub-pixel of the R component constituting the pixel at the pixel position shown in FIG. 13 is calculated by the following formula.

$$Y0j=(1-Wi/W0)\times\{(1-Hj/H0)\times Y0a+Hj/H0\times Y0b\}+Wi/W0\times\{(1-Hj/H0)\times Y0c+Hj/H0\times Y0d\} \quad (4)$$

It should be noted that although the case of calculating the amounts of misalignment of the display position of the display sub-pixel of the R component is explained with reference to FIG. 13, the amounts of misalignment of the display position of the display sub-pixel of the other color component constituting the display pixel at the present pixel position can also be calculated in substantially the same manner.

Figure 14:
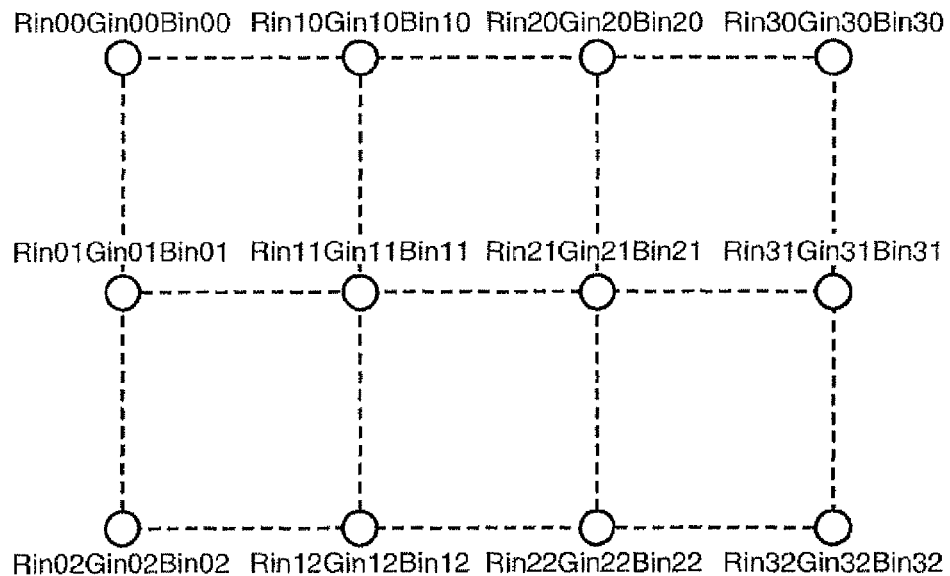
FIG. 14 is a diagram for explaining the step S16 shown in FIG. 10.
Figure 15:
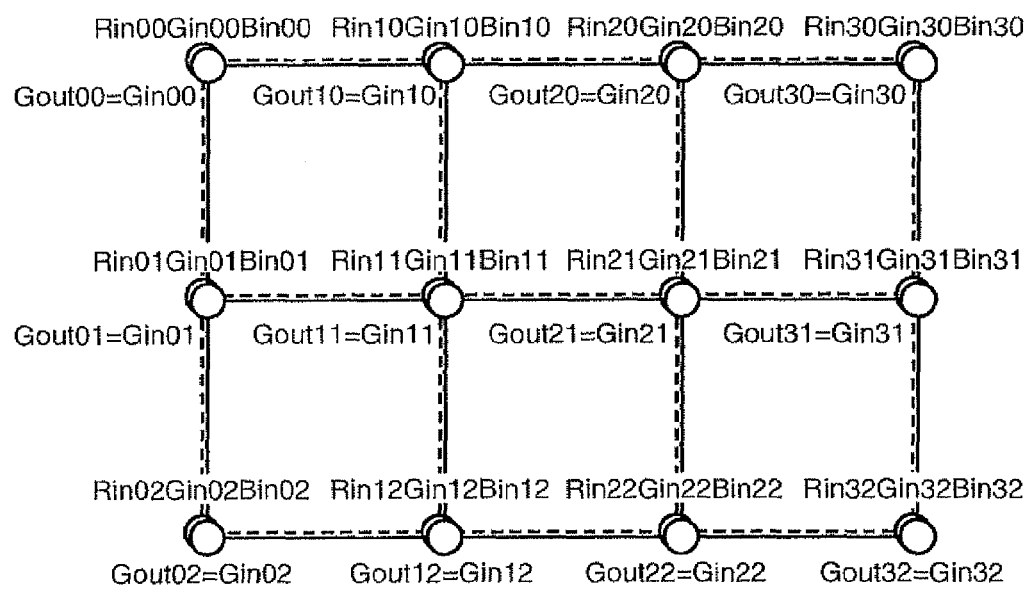
FIG. 15 is a diagram for explaining the step S16 shown in FIG. 10.
Figure 16:
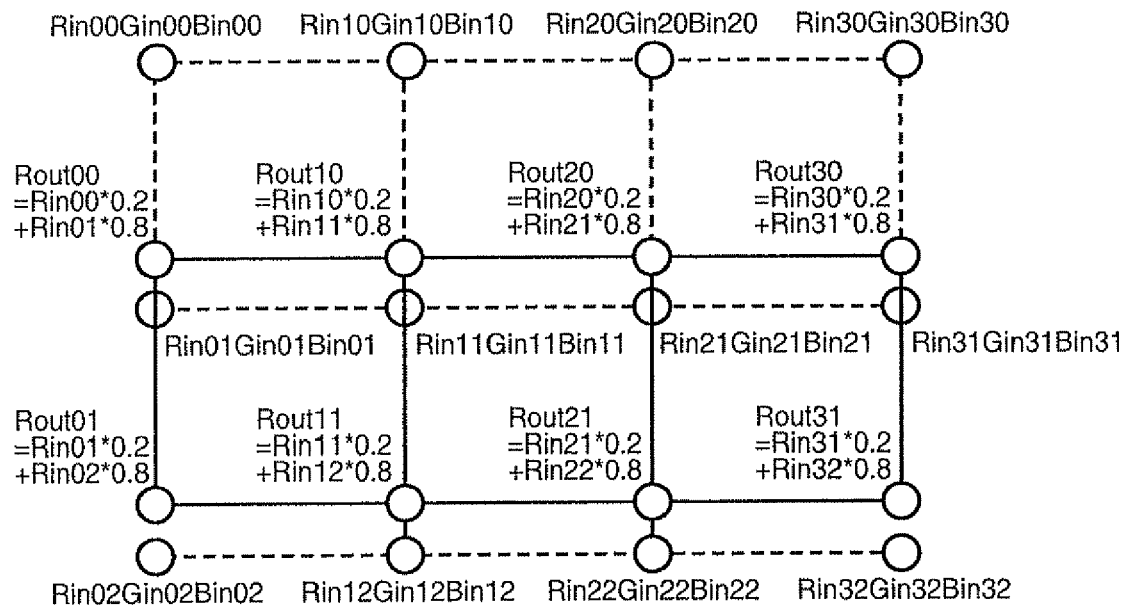
FIG. 16 is a diagram for explaining the step S16 shown in FIG. 10.
Figure 17:
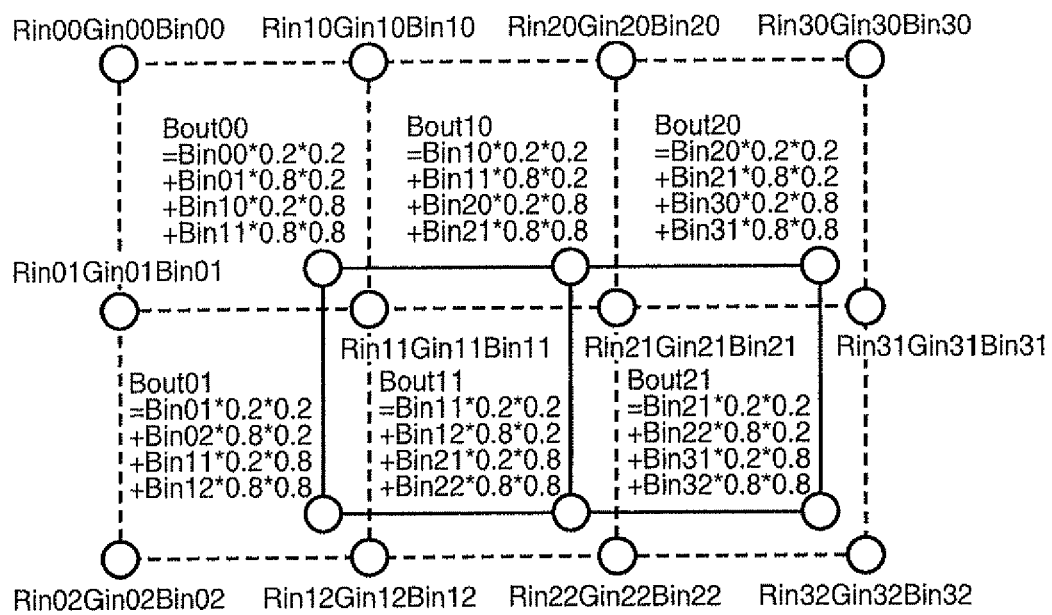
FIG. 17 is a diagram for explaining the step S16 shown in FIG. 10.

FIGS. 14, 15, 16, and 17 are diagrams for explaining the step S16 shown in FIG. 10. In FIGS. 14 through 17, the amounts of misalignment are defined using the pixel at the upper left end of the display screen DSP as the origin. FIG. 14 schematically shows the input image signals corresponding to the sub-pixels constituting the pixels in the upper left corner area of the display screen DSP. FIG. 15 schematically shows the image signal having been corrected and output by the image signal correction section 230 with respect to the input image signal corresponding to the sub-pixel of the G component constituting the pixels in the upper left corner area of the display screen DSP. FIG. 16 schematically shows an example of the image signal having been corrected and output by the image signal correction section 230 with respect to the input image signal corresponding to the sub-pixel of the R component constituting the pixels in the upper left corner area of the display screen DSP. FIG. 17 schematically shows an example of the image signal having been corrected and output by the image signal correction section 230 with respect to the input image signal corresponding to the sub-pixel of the B component constituting the pixels in the upper left corner area of the display screen DSP.

FIG. 14 describes the input image signals of the sub-pixels constituting each pixel for each color component. For example, the image signal corresponding to the display sub-pixel of the R component constituting the upper left display pixel is Rin00, the image signal corresponding to the display sub-pixel of the G component constituting this display pixel is Gin00, and the image signal corresponding to the display sub-pixel of the B component constituting the upper left display pixel is Bin00. The same applies to other display pixels. The image signal correction section 230 outputs the image signals obtained by executing the correction on the input image signals shown in FIG. 14 for each sub-pixel.

FIG. 15 shows the input image signals shown in FIG. 14, and the image signal of the sub-pixel of the G component output by the image signal correction section 230 and corresponding to the input image signals. Specifically, in FIG. 15, the image signal of the G component output by the image signal correction section 230 is described as Gout00, Gout10, . . . , Gout22, and Gout 32. Since the image signal correction section 230 in the present embodiment executes, based on the display sub-pixel positions of the G component constituting the present pixel, the correction process corresponding to the amounts of misalignment of the display sub-pixel of the other color component constituting the present pixel, the image signal of the G component output by the image signal correction section 230 is a part of the input image signal corresponding to the G component as shown in FIG. 15. Therefore, in the present embodiment, the correction process for the G component can be eliminated.

FIG. 16 shows the input image signals shown in FIG. 14, and the image signal of the sub-pixel of the R component output by the image signal correction section 230 and corresponding to the input image signals. Specifically, in FIG. 16, the image signal of the R component having been corrected by the image signal correction section 230 is described as Rout00, Rout10, . . . , Rout22, and Rout 32. Although the amounts of misalignment of the sub-pixels may be different between the sub-pixels, it is assumed in FIG. 16 that in the sub-pixels of the R component Rout00 through Rout32, the amounts of misalignment of "0" in the horizontal direction and "0.8" in the vertical direction are common therethrough.

In this case, the image signal (the pixel values) Rout00, Rout10 of the sub-pixels of the R component can be obtained as the following formula by, for example, a bilinear method.

$$Rout00=Rin00\times 0.2+Rin01\times 0.8$$

$$Rout10=Rin10\times 0.2+Rin11\times 0.8 \quad (5)$$

The image signal (e.g., Rout20, Rout01) of the other sub-pixels of the R component shown in FIG. 16 can also be obtained in substantially the same manner.

FIG. 17 shows the input image signals shown in FIG. 14, and the image signal of the sub-pixel of the B component output by the image signal correction section 230 and corresponding to the input image signals. Specifically, in FIG. 17, the image signal of the B component having been corrected by the image signal correction section 230 is described as Bout00, Bout10, . . . , Bout22, and Bout 32. Although the amounts of misalignment of the sub-pixels may be different between the sub-pixels, it is assumed in FIG. 17 that in the sub-pixels of the B component Bout00 through Bout32, the amounts of misalignment of "0.8" in the horizontal direction and "0.2" in the vertical direction are common therethrough.

In this case, the image signal (the pixel values) Bout00, Bout10 of the sub-pixels of the B component can be obtained as the following formula by, for example, a bilinear method.

$$Bout00=Bin00\times 0.2\times 0.2+Bin01\times 0.8\times 0.2+Bin10\times 0.2\times 0.8+Bin11\times 0.8\times 0.8$$

$$Bout10=Bin10\times 0.2\times 0.2+Bin11\times 0.8\times 0.2+Bin20\times 0.2\times 0.8+Bin21\times 0.8\times 0.8 \quad (6)$$

The image signal (e.g., Bout20, Bout01) of the other sub-pixels of the B component shown in FIG. 17 can also be obtained in substantially the same manner.

The correction process of the image signals as described above is executed in the step S16 shown in FIG. 10.

As described above, according to the present embodiment, it becomes possible to prevent the degradation of image quality due to the misalignment of the display positions of the sub-pixels constituting each pixel regardless of the color aberration accuracy of the optical system of the projector 20.

FIRST MODIFIED EXAMPLE

Although in the present embodiment the explanations are presented assuming that there are four reference positions, the invention is not limited thereto, but a configuration with two reference positions can also be adopted.

Figure 18:
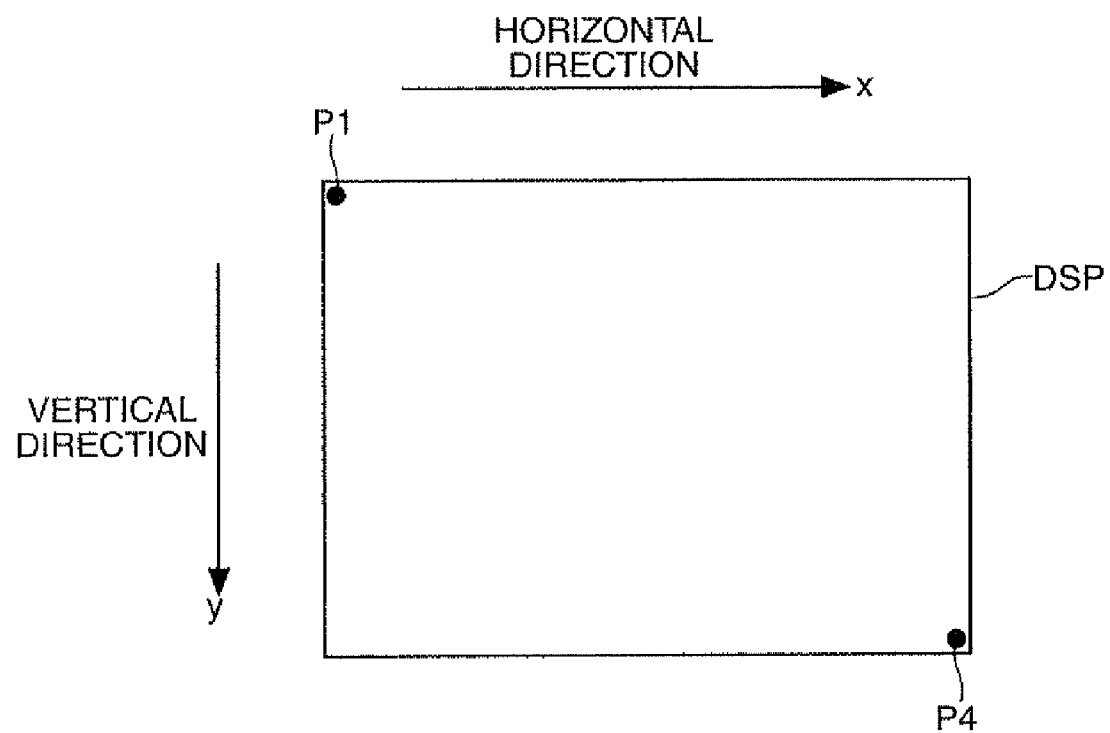
FIG. 18 is a diagram for explaining the reference positions in a first modified example of the present embodiment.

FIG. 18 is a diagram for explaining the reference positions in a first modified example of the present embodiment. In FIG. 18, the same sections as those in FIG. 4 are denoted with the same reference symbols, and explanations therefor are omitted if appropriate.

FIG. 19 shows the amounts of misalignment stored in the misalignment amount storage section in the first modified example of the present embodiment. In FIG. 19, the same sections as those in FIG. 5 are denoted with the same reference symbols, and explanations therefor are omitted if appropriate.

As shown in FIG. 18, the reference positions correspond to first and fourth pixel positions P1, P4 in the display screen DSP on the screen SCR by the projector 20. Specifically, the misalignment amount storage section in the first modified example stores the amounts of misalignment in each of the pixel positions, namely the first pixel position P1 at the upper left end of the display screen DSP and the fourth pixel position P4 at the lower right end thereof. The amounts of misalignment of the display sub-pixels at the other pixel positions in the display screen DSP are obtained by interpolating the amounts of misalignment at the first and fourth pixel positions P1, P4 stored in the misalignment amount storage section.

It should be noted that although in the first modified example the explanations are presented assuming that the reference positions correspond to the two points of the first and fourth pixel positions P1, P4, they can also correspond to the two points of the second and third pixel positions P2, P3.

According to the first modified example of the present embodiment described above, despite the fact that there is a possibility of increasing the error due to the interpolation process of the amounts of misalignment described above, it becomes possible to prevent the degradation of image quality caused by the misalignment of the display positions of the sub-pixels constituting each pixel regardless of the color aberration accuracy of the optical system of the projector 20. Further, according to the first modified example, since the storage capacity for the amounts of misalignment for the misalignment storage section to store can be reduced in comparison with the case shown in FIG. 5 as shown in FIG. 19, it becomes possible to achieve further cost reduction of the image processing section 200 and the projector 20 including the image processing section 200.

SECOND MODIFIED EXAMPLE

Although in the present embodiment the explanations are presented assuming that there are four reference positions, the invention is not limited thereto, but a configuration with nine reference positions can also be adopted.

Figure 20:
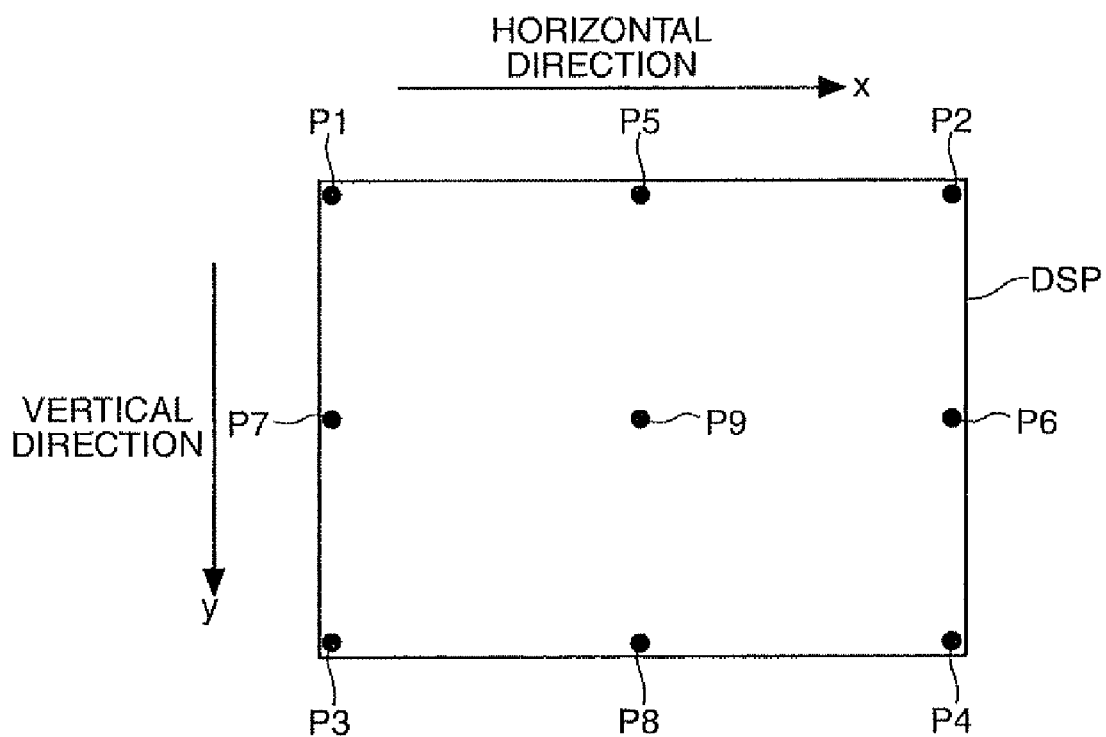
FIG. 20 is a diagram for explaining the reference positions in a second modified example of the present embodiment.

FIG. 20 is a diagram for explaining the reference positions in a second modified example of the present embodiment. In FIG. 20, the same sections as those in FIG. 4 are denoted with the same reference symbols, and explanations therefor are omitted if appropriate.

As shown in FIG. 20, the reference positions correspond to first through ninth pixel positions P1 through P9 in the display screen DSP on the screen SCR by the projector 20. Specifically, the misalignment amount storage section in the second modified example stores the amounts of misalignment at a first pixel position P1 at the upper left end of the display screen DSP, a second pixel position P2 at the upper right end thereof, a third pixel position P3 at the lower left end thereof, a fourth pixel position P4 at the lower right end thereof, a fifth pixel position P5 at the midpoint between the first and second pixel positions P1, P2, a sixth pixel position P6 at the midpoint between the second and fourth pixel positions P2, P4, a seventh pixel position P7 at the midpoint between the first and third pixel positions P1, P3, an eighth pixel position P8 at the midpoint between the third and fourth pixel positions P3, P4, and a ninth pixel position P9 at an approximate center of the first through fourth pixel positions P1 through P4. The ninth pixel position P9 is located at the midpoint between the sixth and seventh pixel positions P6, P7, and at the same time, at the midpoint between the fifth and eighth pixel positions P5, P8. The amounts of misalignment of the display sub-pixels at the other pixel positions in the display screen DSP are obtained by interpolating the amounts of misalignment at the first and fourth pixel positions P1, P4 stored in the misalignment amount storage section.

According to the second modified example of the present embodiment described above, the error can be reduced by the interpolation process of the amounts of misalignment described above, it becomes possible to more accurately prevent the degradation of image quality caused by the misalignment of the display positions of the sub-pixels constituting each pixel regardless of the color aberration accuracy of the optical system of the projector 20.

THIRD MODIFIED EXAMPLE

Although in the present embodiment the explanations are presented assuming that the amounts of misalignment at the reference positions are stored as described above for each of the nine levels of amounts of shift of the projection lens 170, the invention is not limited thereto, but it is also possible to store the amounts of misalignment at the reference positions for each of four levels of amounts of shift.

Figure 21:
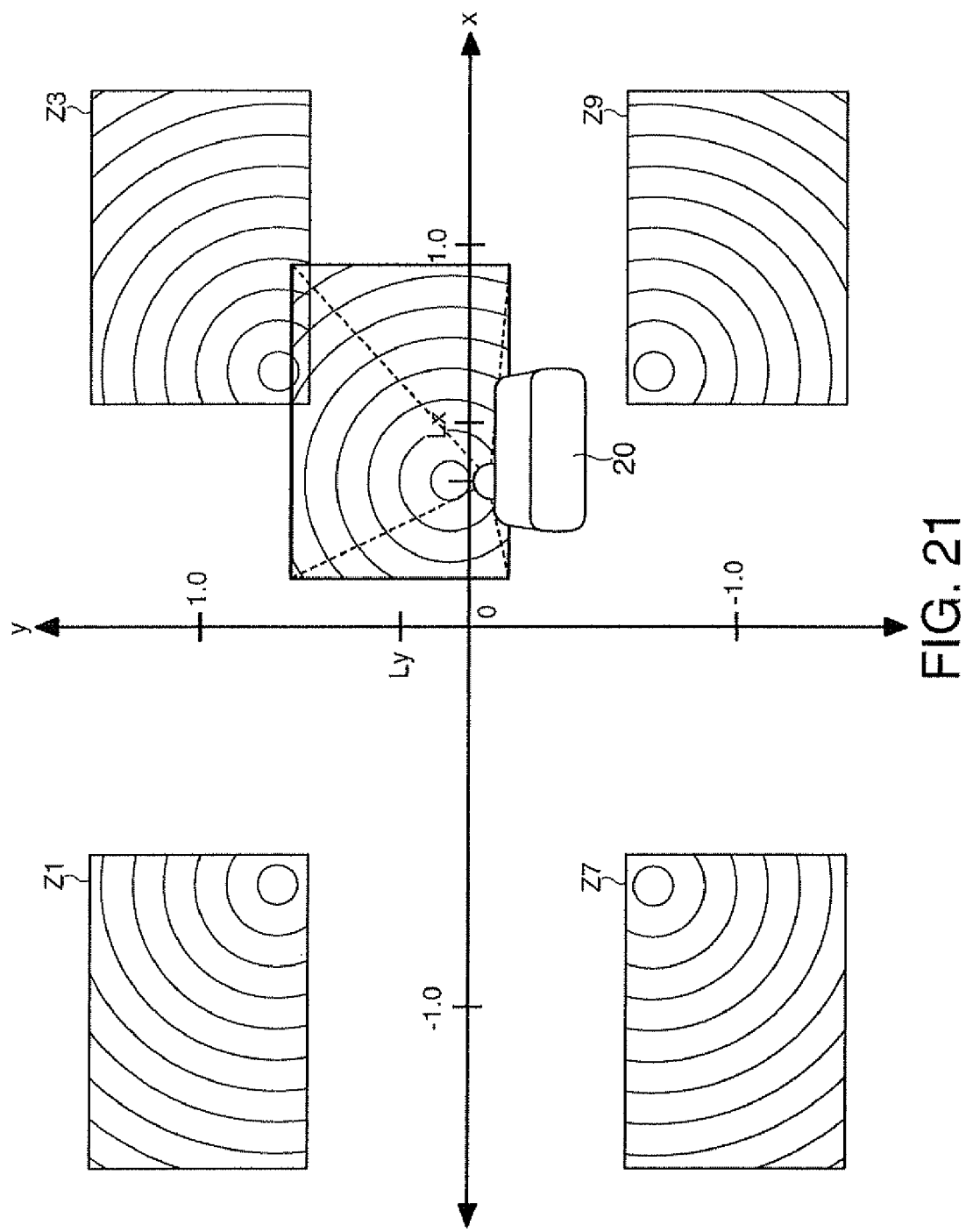
FIG. 21 is a diagram for explaining the amounts of shift at which the amounts of misalignment are stored to the misalignment amount storage section in a third modified example of the present embodiment.

FIG. 21 is a diagram for explaining the amounts of shift at which the amounts of misalignment are stored to the misalignment amount storage section in a third modified example of the present embodiment. In FIG. 21, the same sections as those in FIG. 11 are denoted with the same reference symbols, and explanations therefor are omitted if appropriate.

FIG. 22 shows the amounts of misalignment stored in the misalignment amount storage section in the third modified example of the present embodiment. In FIG. 22, the same sections as those in FIG. 5 are denoted with the same reference symbols, and explanations therefor are omitted if appropriate.

In the third modified example, only the groups of amounts of misalignment Z1, Z3, Z7, Z9 shown in FIG. 11 are stored in the misalignment amount storage section. The groups of amounts of misalignment corresponding to the other amounts of shift are obtained by interpolating the groups of amounts of misalignment Z1, Z3, Z7, Z9.

It should be noted that although in the third modified example explanations are presented assuming that only the groups of amounts of misalignment Z1, Z3, Z7, Z9 shown in FIG. 11 are stored in the misalignment amount storage section, it is also possible to store only the groups of amounts of misalignment Z2, Z4, Z6, Z8 shown in FIG. 11 in the misalignment amount storage section.

According to the third modified example of the present embodiment described above, despite the fact that there is a possibility of increasing the error compared to the present embodiment due to the interpolation process of the amounts of shift, it becomes possible to prevent the degradation of image quality caused by the misalignment of the display positions of the sub-pixels constituting each pixel regardless of the color aberration accuracy of the optical system of the projector 20. Further, according to the third modified example, since the storage capacity for the amounts of misalignment for the misalignment storage section to store can be reduced in comparison with the case shown in FIG. 5 as shown in FIG. 22, it becomes possible to achieve further cost reduction of the image processing section 200 and the projector 20 including the image processing section 200.

Further, by applying the first modified example to the third modified example, the storage capacity for the amounts of misalignment for the misalignment amount storage section to store can significantly be reduced while preventing the degradation of image quality due to the misalignment of the display positions of the sub-pixels constituting each pixel regardless of the color aberration accuracy of the optical system of the projector 20.

FOURTH MODIFIED EXAMPLE

Although in the present embodiment the explanations are presented assuming that the amounts of misalignment at the reference positions are stored as described above for each of the nine levels of amounts of shift of the projection lens 170, the invention is not limited thereto, but it is also possible to store the amounts of misalignment at the reference positions for each of two levels of amounts of shift.

Figure 23:
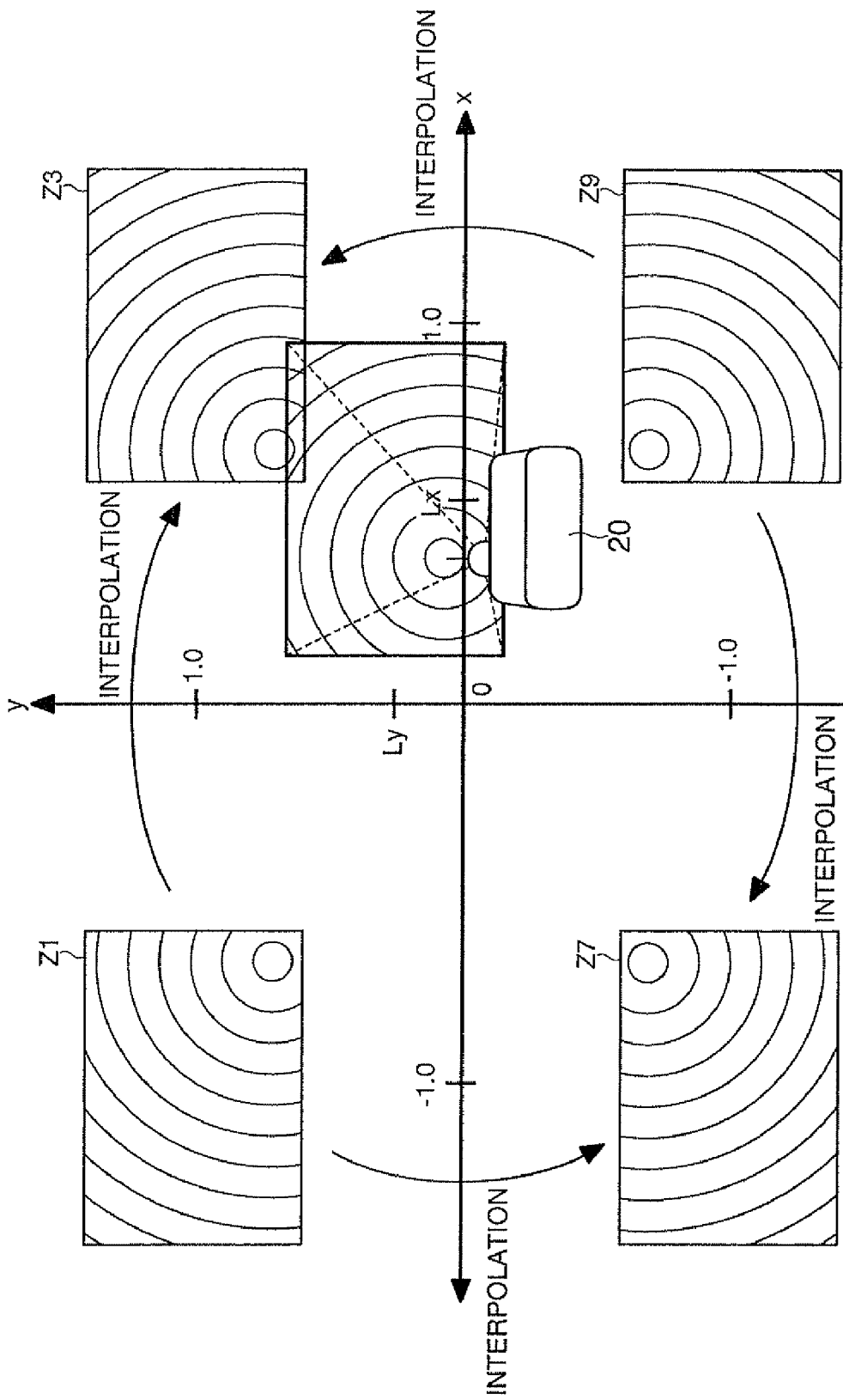
FIG. 23 is a diagram for explaining the amounts of shift at which the amounts of misalignment are stored to the misalignment amount storage section in a fourth modified example of the present embodiment.

FIG. 23 is a diagram for explaining the amounts of shift at which the amounts of misalignment are stored to the misalignment amount storage section in a fourth modified example of the present embodiment. In FIG. 23, the same sections as those in FIG. 11 are denoted with the same reference symbols, and explanations therefor are omitted if appropriate.

In the fourth modified example, only the groups of amounts of misalignment Z1, Z9 shown in FIG. 11 are stored in the misalignment amount storage section. The groups of amounts of misalignment corresponding to the other amounts of shift are obtained by interpolating the groups of amounts of misalignment Z1, Z9. For example, it is possible to obtain the group of amounts of misalignment Z3 by interpolating the groups of amounts of misalignment Z1, Z9, and to obtain the group of amounts of misalignment Z7 by interpolating the groups of amounts of misalignment Z1, Z9.

It should be noted that although in the fourth modified example explanations are presented assuming that only the groups of amounts of misalignment Z1, Z9 shown in FIG. 11 are stored in the misalignment amount storage section, it is also possible to store only the groups of amounts of misalignment Z3, Z7 shown in FIG. 11 in the misalignment amount storage section.

According to the fourth modified example of the present embodiment described above, despite the fact that there is a possibility of increasing the error compared to the present embodiment due to the interpolation process of the amounts of shift, it becomes possible to prevent the degradation of image quality caused by the misalignment of the display positions of the sub-pixels constituting each pixel regardless of the color aberration accuracy of the optical system of the projector 20. Further, according to the fourth modified example, since the storage capacity for the amounts of misalignment for the misalignment storage section to store can be reduced in comparison with the case shown in FIG. 5 similarly to the case with the third modified example, it becomes possible to achieve further cost reduction of the image processing section 200 and the projector 20 including the image processing section 200.

Further, by applying the first modified example to the fourth modified example, the storage capacity for the amounts of misalignment for the misalignment amount storage section to store can significantly be reduced while preventing the degradation of image quality due to the misalignment of the display positions of the sub-pixels constituting each pixel regardless of the color aberration accuracy of the optical system of the projector 20.

Although the image processing device, the image display apparatus, and the image processing method according to the embodiment of the invention are explained hereinabove, the invention is not limited to the embodiment described above, but can be put into practice in various forms within the scope or the spirit of the invention, and the following modifications, for example, are also possible.

1. Although in the embodiment or the modified examples thereof described above the explanations are presented assuming that each pixel is composed of the sub-pixels corresponding respectively to three color components, the invention is not limited to this configuration. The number of color components constituting the pixel can be two or more than three.

2. Although in the embodiment or the modified examples thereof described above the explanations are presented assuming that the amounts of misalignment of the display position of the display sub-pixel of the R component and the amounts of misalignment of the display position of the display sub-pixel of the B component are stored in the misalignment amount storage section based on the display position of the display sub-pixel of the G component, the invention is not limited to this configuration. For example, it is also possible to take the display positions of the display sub-pixels of the R component or the display positions of the display sub-pixels of the B component as the reference for storing the amounts of misalignment of the display positions of the display sub-pixels of the other color components in the misalignment amount storage section. Further, it is also possible to define the amounts of misalignment of the display sub-pixel of respective color components based on the display position of the display pixel (display sub-pixel) of a given reference pixel without selecting the color component to be the reference among the plurality of color components constituting each pixel.

3. Although in the embodiment or the modified examples thereof described above the explanations are presented assuming that there are four representative points, the invention is not limited to the number of representative points, but it is also possible to provide only two representative points.

4. Although in the embodiment or the modified examples thereof described above the explanations are presented assuming that there are two, four, or nine reference positions, the invention is not limited to the number of reference positions.

5. Although in the embodiment or the modified examples thereof described above the explanations are presented assuming that the light valve is used as the light modulation section, the invention is not limited to this configuration. It is also possible to adopt, for example, Digital Light Processing (DLP, a registered trademark), Liquid Crystal On Silicon (LCOS), and so on as the light modulation section.

6. Although in the embodiment described above the explanations are presented exemplifying the light valve using so-called three-panel transmissive liquid crystal panels as the light modulation section, it is also possible to adopt a light valve using a single liquid crystal panel, or four or more panel transmissive liquid crystal panels.

7. Although in the embodiment described above the invention is explained as the image processing device, the image display apparatus, and the image processing method, the invention is not limited to these aspects For example, the invention can be a program describing the processing procedure of the image processing method for realizing the invention or a recording medium on which the program is recorded.

The entire disclosure of Japanese Patent Application No. 2008-094761, filed Apr. 1, 2008 is expressly incorporated by reference herein.

What is claimed is:

1. An image processing device comprising:
   an image display apparatus that displays a first color component image and a second color component image such that the first color component image and the second color component image overlap each other;
   a lens-shift amount acquisition section adapted to acquire an amount of shift of a projection lens of an image display apparatus;
   an image signal correction section adapted to correct the image signal corresponding to a sub-pixel of a pixel in accordance with the amount of shift acquired by the lens-shift amount acquisition section to correct displacement of the sub-pixel relative to another sub-pixel of the pixel due to the lens-shift; and
   a non-transitory computer readable memory storing a program enabling the lens-shift amount acquisition section to acquire the amount of shift, and the image signal correction section to correct the image signal, wherein
   the amount of shift acquired by the lens-shift amount acquisition section corresponds to a displacement of the first color component image relative to the second color component image due to the lens-shift.

2. The image processing device according to claim 1, further comprising:
   a misalignment amount storage section adapted to store an amount of misalignment of a display position of a display sub-pixel corresponding to the sub-pixel relative to another sub-pixel of the pixel at a plurality of reference positions in a display screen displayed by the image display apparatus correspondingly to the amount of shift of the lens,
   wherein the image signal correction section corrects the image signal corresponding to the sub-pixel using the amount of misalignment stored in the misalignment amount storage section.

3. The image processing device according to claim 2, wherein
   the image signal correction section includes a representative sub-pixel misalignment amount calculation section adapted to calculate an amount of misalignment of a display position of the display sub-pixel at a given representative point in the display screen corresponding to the amount of shift based on the amount of misalignment stored in the misalignment amount storage section, and
   the image signal correction section obtains, based on the amount of misalignment in the representative point calculated by the representative sub-pixel misalignment amount calculation section, an amount of misalignment of a display position of a display sub-pixel corresponding to the sub-pixel of a present pixel relative to another sub-pixel of the present pixel, and corrects the image signal corresponding to the sub-pixel using the amount of misalignment of the display position of the display sub-pixel.

4. The image processing device according to claim 3, wherein
   the representative point corresponds to a pixel position at an upper left end, an upper right end, a lower left end, or a lower right end of the display screen displayed with the amount of shift.

5. The image processing device according to claim 2, wherein
   the misalignment amount storage section stores amounts of misalignment at a first pixel position at an upper left end, a second pixel position at an upper right end, a third pixel position at a lower left end, and a fourth pixel position at a lower right end of the display screen.

6. The image processing device according to claim 1, wherein
   each of the pixels is composed mainly of a sub-pixel of an R component, a sub-pixel of a G component, and a sub-pixel of a B component, and
   the misalignment amount storage section stores, based on a display position of a display sub-pixel corresponding to the sub-pixel of the G component, an amount of misalignment of a display position of a display sub-pixel corresponding to the sub-pixel of the R component constituting the display pixel, and an amount of misalignment of a display position of a display sub-pixel corresponding to the sub-pixel of the B component constituting the display pixel.

7. An image display apparatus that displays a first color component image and a second color component image such that the first color component image and the second color component image overlap each other, the image display apparatus comprising:
   a projection lens;
   a lens-shift amount acquisition section adapted to acquire an amount of shift of the projection lens;
   an image signal correction section adapted to correct the image signal corresponding to a sub-pixel of a pixel in accordance with the amount of shift acquired by the lens-shift amount acquisition section to correct displacement of the sub-pixel relative to another sub-pixel of the pixel due to the lens-shift;
   an image display section adapted to display an image based on the corrected image signal of the sub-pixel; and
   a non-transitory computer readable memory storing a program enabling the lens-shift amount acquisition section to acquire the amount of shift, the image signal correction section to correct the image signal, and the image display section to display an image, wherein
   the amount of shift acquired by the lens-shift amount acquisition section corresponds to a displacement of the first color component image relative to the second color component image due to the lens-shift.

8. The image display apparatus according to claim 7, further comprising:
   a misalignment amount storage section adapted to store an amount of misalignment of a display position of a display sub-pixel corresponding to the sub-pixel relative to another sub-pixel of the pixel at a plurality of reference positions in a display screen displayed by the image display apparatus correspondingly to the amount of shift of the projection lens, wherein the image signal correction section corrects the image signal corresponding to the sub-pixel using the amount of misalignment stored in the misalignment amount storage section.

9. The image display apparatus according to claim 8, wherein the image signal correction section includes a representative sub-pixel misalignment amount calculation section adapted to calculate an amount of misalignment of a display position of the display sub-pixel at a given representative point in the display screen corresponding to the amount of shift based on the amount of misalignment stored in the misalignment amount storage section, and the image signal correction section obtains, based on the amount of misalignment in the representative point calculated by the representative sub-pixel misalignment amount calculation section, an amount of misalignment of a display position of a display sub-pixel corresponding to the sub-pixel of a present pixel relative to another sub-pixel of the present pixel, and corrects the image signal corresponding to the sub-pixel using the amount of misalignment of the display position of the display sub-pixel.

10. The image display apparatus according to claim 9, wherein the representative point corresponds to a pixel position at an upper left end, an upper right end, a lower left end, or a lower right end of the display screen displayed with the amount of shift.

11. The image display apparatus according to claim 8, wherein the misalignment amount storage section stores amounts of misalignment at a first pixel position at an upper left end, a second pixel position at an upper right end, a third pixel position at a lower left end, and a fourth pixel position at a lower right end of the display screen.

12. The image display apparatus according to claim 7, wherein each of the pixels is composed mainly of a sub-pixel of an R component, a sub-pixel of a G component, and a sub-pixel of a B component, and the misalignment amount storage section stores, based on a display position of a display sub-pixel corresponding to the sub-pixel of the G component, an amount of misalignment of a display position of a display sub-pixel corresponding to the sub-pixel of the R component constituting the display pixel, and an amount of misalignment of a display position of a display sub-pixel corresponding to the sub-pixel of the B component constituting the display pixel.

13. A non-transitory computer readable medium storing a program that causes a projector to execute a image processing method adapted to correct an image signal designating an amount of modulation of a passing light beam of a lens of an image display apparatus having a lens shift function, the image processing method comprising:

displaying a first color component image and a second color component image such that the first color component image and the second color component image overlap each other;

acquiring an amount of shift of the lens such that the amount of shift of the lens corresponds to a displacement of the first color component image relative to the second color component image due to the lens-shift; and correcting the image signal corresponding to a sub-pixel of a pixel in accordance with the amount of shift acquired in the acquiring step to correct displacement of the sub-pixel relative to another sub-pixel of the pixel due to the lens-shift.

* * * * *